United States Patent
Hegmann et al.

(10) Patent No.: US 8,323,755 B2
(45) Date of Patent: Dec. 4, 2012

(54) PLANAR NEMATIC LIQUID CRYSTAL CELLS DOPED WITH NANOPARTICLES AND METHODS OF INDUCING A FREEDERICKSZ TRANSITION

(75) Inventors: Torsten Hegmann, Winnipeg (CA); Brandy Melissa Kinkead, Burnaby (CA)

(73) Assignee: University of Manitoba, Winnipeg, Manitoba (CA)

( * ) Notice: Subject to any disclaimer, the term of this patent is extended or adjusted under 35 U.S.C. 154(b) by 343 days.

(21) Appl. No.: 12/660,203

(22) Filed: Feb. 22, 2010

(65) Prior Publication Data
US 2010/0302470 A1 Dec. 2, 2010

Related U.S. Application Data

(60) Provisional application No. 61/217,336, filed on May 29, 2009.

(51) Int. Cl.
G02F 1/133 (2006.01)
G02F 1/1337 (2006.01)
C09K 19/30 (2006.01)
C09K 19/54 (2006.01)

(52) U.S. Cl. ........... 428/1.3; 428/1.1; 428/1.2; 349/163; 349/166; 349/186; 349/124; 349/127; 252/299.01; 252/299.5; 252/299.61; 977/779; 977/788; 977/813

(58) Field of Classification Search ............. 252/299.01, 252/299.5; 428/1.1, 1.2, 1.3; 349/33, 36, 349/124, 166, 186, 127, 163; 977/733, 734, 977/779, 788, 813
See application file for complete search history.

(56) References Cited

U.S. PATENT DOCUMENTS

| 6,287,649 B1 | 9/2001 | Fukushima et al. |
| 6,482,988 B2 | 11/2002 | Fukushima et al. |
| 2004/0250750 A1 | 12/2004 | Reda et al. |
| 2010/0195008 A1* | 8/2010 | Hegmann et al. ............... 349/33 |

FOREIGN PATENT DOCUMENTS

| CA | 2 334 238 A1 | 12/1999 |
| CA | 2 537 199 A1 | 3/2005 |
| WO | WO 2008/134866 A1 | 11/2008 |

OTHER PUBLICATIONS

Andrienko et al., "Computer simulation of topological defects around a colloidal particle or droplet dispersed in a nematic host," *Phys. Rev. E Stat. Nonlin. Soft Matter Phys.*, 2001; 63(4): 041701-1-041701-8. Published online Mar. 20, 2001.
Boettcher et al., "Tunable electronic interfaces between bulk semiconductors and ligand-stabilized nanoparticle assemblies," *Nat. Mater.*, Aug. 6, 2007, 592-596. Published online Jun. 24, 2007.
Buchnev et al., "New non-synthetic method to modify properties of liquid crystals using micro- and nano-particles," *J. Soc. Inf. Disp.*, 2005, 13(9), 749-754.

(Continued)

*Primary Examiner* — Shean C Wu
(74) *Attorney, Agent, or Firm* — Mueting Raasch & Gebhardt, P.A.

(57) ABSTRACT

Nematic liquid crystal cells with positive dielectric anisotropy that include colloidal suspensions having nanoclusters (e.g., CdTe nanoclusters, CdSe nanoclusters) that include a pure monolayer of ligands are provided as well as methods of inducing Freedericksz transitions in the nematic liquid crystal cells and methods of controlling the alignment of a liquid crystal.

31 Claims, 19 Drawing Sheets

OTHER PUBLICATIONS

Buchnev et al., "Enhanced two-beam coupling in colloids of ferroelectric nanoparticles in liquid crystals," *J Opt. Soc. Amer. B*, Jul. 2007, 24(7), 1512-1516. Published online Jun 15, 2007.

Buda et al., "A Hausdorff chirality measure," *J.Am. Chem. Soc.*, Jul. 1992; 114(15):6006-6012.

Coffey et al., "Chiral Hausdorff metrics and structural spectroscopy in a complex system," *J Phys. A: Math. Gen.*, Mar. 1999; 32(12):2263-2284.

Ćopićet al., "Coupled director and polarization fluctuations in suspensions of ferroelectric nanoparticles in nematic liquid crystals," *Phys. Rev. E*, 2007, 76, 011702(1-5). Published online Jul. 11, 2007.

Da Cruz et al., "Phase behavior of nanoparticles in a thermotropic liquid crystal," *J. Phys. Chem. B*, 2005, 109(30), 14292-14299. Published online Jul. 12, 2005.

Dasog et al., "Understanding the oxidative stability of gold monolayer-protected clusters in the presence of halide ions under ambient conditions," *Langmuir*, 2007, 23, 3381-3387. Published online Feb. 2, 2007.

Dierking, *Textures of Liquid Crystals*, Willey-VCH, Weinheim, Gelinany, 2003, title page, copyright pages and table of contents only, 6 pgs.

Diorio Jr. et al., "The electro-optic properties of colloidal silica filled nematics," *Liq. Cryst.*, 2002, 29(4), 589-596.

Dunmur et al., "Elastic Properties," in *Handbook of Liquid Crystals*, Demus et al. (Eds.), Wiley-VCH (Weinheim), 1998, vol. 1, pp. 253-280.

Feng et al., "Orientational defects near colloidal particles in a nematic liquid crystal," *J Colloid Interface Sci.*, Jan. 1, 2004; 269(1):72-78.

Friedel, "The mesomorphic states of matter," *Ann. Phys. Paris*, 1922; 18:273-474. (publication in French and English translation translated by the Translation and Interpretation Division of the Institute of Modern Languages, Washington, D.C. English translation obtained from the University of Minnesota Library Service (ESTIS)).

Fukada et al., "Interaction between particles in a nematic liquid crystal: Numerical study using the Landau-de Genres continuum theory," *Mol. Cryst. Liq. Cryst.*, 2005; 435:63/723-74/734.

Gaponik et al., "Efficient phase transfer of luminescent thiol-capped nanocrystals: from water to non-polar organic solvents," *Nano. Lett.*, 2002;2(8):803-806. Published online Jul. 12, 2002.

Gu et al., "Observation of saturn-ring defects around solid microspheres in nematic liquid crystals," *Phys. Rev. Lett.*, Nov. 27, 2000; 85(22):4719-4722.

Guzmán et al., "Quenched disorder in a liquid-crystal biosensor: Adsorbed nanoparticles at confining walls," *J Chem. Phys.*, May 8, 2005, 122, 184711(1-10). Published online May 11, 2005.

Haraguchi et al., "Reduction of the threshold voltages of nematic liquid crystal electrooptical devices by doping inorganic nanoparticles," *Jpn. J Appl. Phys.*, 2007, 46(34), 796-797.

Hu et al., "A convenient trimethylsilylthioxy-dehalogenation reaction for the preparation of functionalized thiols," *J Org. Chem.*, 1999; 64(13):4959-4961.

Knobloch et al., "Command surface controlled liquid crystal waveguide structures as optical infounation storage," *J Appl. Phys.*, Dec. 15, 1994, 76(12), 8212-8214.

Knobloch et al., "Photochromic command surface induced switching of liquid crystal optical waveguide structures," *J. AppL Phys.*, Jan. 15, 1995, 77(2), 481-487.

Kobayashi et al., "Dielectric spectroscopy of metal nanoparticle doped liquid crystal displays exhibiting frequency modulation response," *J. Display Technol.*, Jun. 2006, 2(2), 121-129.

Kossyrev et al., "Electric field tuning of plasmonic response of nanodot array in liquid crystal matrix," *Nano Lett.*, 2005, 5(10), 1978-1981. Published online Sep. 9, 2005.

Kossyrev et al., "Branching of colloidal chains in capillary-confined nematics," *Phys. Rev. Lett.*, Feb. 2006; 96(4):048301-1-048301-4. Epub Feb. 2, 2006.

Kuksenok et al., "Director structure around a colloid particle suspended in a nematic liquid crystal," *Phys. Rev. E*, Nov. 1996; 54(5):5198-5203.

Lapointe et al., "Elastic torque and the levitation of metal wires by a nematic liquid crystal," *Science*, Jan. 30, 2004, 303, 652-655.

Li et al., "Ferroelectric nanoparticle/liquid-crystal colloids for display applications," *J Soc. Inf. Disp.*, 2006,14(6), 523-527.

Li et al., "Orientational coupling amplification in ferroelectric nematic colloids," *Phys. Rev. Lett.*, Oct. 6, 2006, 7(14), 147801(1-4). Published online Oct. 5, 2006.

Loudet et al., "Colloidal ordering from phase separation in a liquid-crystalline continuous phase," *Nature*, Oct. 2000; 407(6804):611-613.

Loudet et al., "Edge dislocations of colloidal chains suspended in a nematic liquid crystal," *Europhys. Lett.*, Apr. 2001; 54:175-181.

Loudet et al., "Application of an electric field to colloidal particles suspended in a liquid-crystal solvent," *Phys. Rev. Letter.*, Oct. 15, 2001; 87(16):165503-1-165503-4. Epub Sep. 27, 2001.

Loudet et al., "Line defect dynamics around a colloidal particle," *Eur. Phys. J E—Soft Matter*, Mar. 2002; 7(3):205-208.

Lubensky et al., "Topological defects and interactions in nematic emulsions," *Phys. Rev. E*, 1998; 57(1):610-625.

Mitov et al., "Long-range structuring of nanoparticles by mimicry of a cholesteric liquid crystal," *Nat. Mater.*, Dec. 2002, 1, 229-231. Published online Nov. 17, 2002.

Mitov et al., "Fingerprint patterning of solid nanoparticles embedded in a cholesteric liquid crystal," *J. Phys.: Condens. Matter*, 2004; 16:S1981-S1988.

Miyama et al., "Fast switching of frequency modulation twisted nematic liquid crystal display fabricated by doping nanoparticles and its mechanism," *Jpn. J Appl. Phys.*, 2004, 43(5A), 2580-2584.

Miyama et al., "Dielectric properties and electro-optic characteristics of TN-LCDs doped with metal nanoparticles exhibiting frequency modulation response accompanying fast response," *Mol. Cryst. Liq. Cryst.*, 2005, 433(1), 29-40. Published online Jun. 1, 2005.

Mondain-Monval et al., "Weak surface energy in nematic dispersions: Saturn ring defects and quadrupolar interactions" *Eur. Phys. J. B*, Nov. 1999; 12(2):167-170.

Ouskova et al., "Dielectric relaxation spectroscopy of a nematic liquid crystal doped with ferroelectric Sn2P2S6 nanoparticles," *Liq. Cryst.*, Oct. 2003, 30(10), 1235-1239.

Pietron et al., "Using electrons stored on quantized capacitors in electron transfer reactions," *J Am. Chem. Soc.*, 1999, 121(23), 5565-5570. Published online May 26, 1999.

Poulin et al., "Novel colloidal interactions in anisotropic fluids," *Science*, Mar. 25, 1997; 275(5307):1770-1773.

Poulin et al., "Direct measurement of colloidal forces in an anisotropic solvent," *Phys. Rev. Lett.*, Dec. 1997; 79(24):4862-4865.

Poulin et al., "Inverted and multiple nematic emulsions," *Phys. Rev. E*, Jan. 1998; 57(1):626-637.

Poulin et al., "Suspension of spherical particles in nematic solutions of disks and rods," *Phys. Rev. E*, 1999; 59(4):4384-4387.

Prasad et al., "Electrical conductivity and dielectric constant measurements of liquid crystal-gold nanoparticle composites," *Liq. Cryst.*, Oct. 2006, 33(10), 1121-1125.

Reshetnyak, "Effective dielectric function of ferroelectric LC suspensions," *Mol. Cryst. Liq. Cryst.*, 2004, 421(1), 219-224. Published online Jan. 1, 2004.

Reshetnyak et al., "Freedericksz transition threshold in nematic liquid crystals filled with ferroelectric nano-particles," *Mol. Cryst. Liq. Cryst.*, 2006, 454,201/[603]-206/[608].

Reznikov et al., "Ferroelectric nematic suspension," *AppL Phys. Lett.*, Mar. 24 2003, 82(12), 1917-1919.

Ruhwandl et al., "Monte Carlo simulation of topological defects in the nematic liquid crystal matrix around a spherical colloid particle," *Phys. Rev. E*, 1997; 56(5):5561-5565.

Sano et al., "Enhancement of characteristics of LCDs by doping nanoparticles: reduction of operating voltage, viscosity, and response times," *Proc. SPIE*, 2006, 613501(1-5).

Shipway et al., "Nanoparticle arrays on surfaces for electronic, optical, and sensor applications," *ChemPhysChem*, 2000, 1, 18-52.

Sikharulidze, "Nanoparticles: An approach to controlling an electro-optical behaviour of nematic liquid crystals," *Appl. Phys. Lett.*, 2005, 86, 033507(1-3). Published online Jan. 14, 2005.

Stark et al., "Water droplets in a spherically confined nematic solvent: A numerical investigation," *Eur. Phys. J B*, Aug. 1, 1999; 10(3):515-523.

Stark, "Director field configurations around a spherical particle in a nematic liquid crystal," *Eur. Phys. J B*, Aug. 1999; 10(2):311-321.

Stark, "Physics of colloidal dispersions in nematic liquid crystals," *Phys. Rep.*, 2001, 351, 387-474.

Stark, "Saturn-ring defects around microspheres suspended in nematic liquid crystals: An analogy between confined geometries and magnetic fields," *Phys. Rev. E*, 2002; 66(3):032701-1-032701-2.

Stark, "Geometric view on colloidal interactions above the nematic-isotropic phase transition," *Phys. Rev. E*, Oct. 30, 2002, 66, 041705(1-4).

Svetec et al., "Annihilation of nematic point defects: Pre-collision and post-collision evolution," *Eur. Phys. J E—Soft Matter*, May 2006; 20(1):71-79.

Templeton et al., "Monolayer-protected cluster molecules," *Acc. Chem. Res.*, 2000; 33(1):27-36. Published online Nov. 18, 1999.

Terrill et al., "Monolayers in three dimensions: NMR, SAXS, thermal, and electron hopping studies of alkanethiol stabilized gold clusters," *J Am. Chem. Soc.*, 1995, 117(50), 12537-12548.

West et al., "Colloidal particles at a nematic-isotropic interface: Effects of confinement," *Eur. Phys. J E*, 2006, 20, 237-242. Published online Jun. 22, 2002.

Williams et al., "Electro-optical and nonlinear optical properties of semiconductor nanorod doped liquid crystals," *Proc. SPIE*, 2005, 5936, 593613(1-6).

Yoshikawa et al., "Frequency modulation response of a tunable birefringent mode nematic liquid crystal electrooptic device fabricated by doping nanoparticles of Pd covered with liquid-crystal molecules," *Jpn. J Appl. Phys.*, 2002, 41 (Part 2, No. 11B), 1315-1317.

Zapotacky et al., "Particle-stabilized defect gel in cholesteric liquid crystals," *Science*, Jan. 8, 1999, 283, 209-212.

Abe et al., "Dielectric and fluorescence study on phase transitions in liquid crystal 5CB and 8CB," J. Korean Phys. Soc., Jan. 2005, 46(1), 220-223.

Asta et al., "Inorganic Nanoparticles—Unique Properties and Novel Applications," *Material Matters*, 2007, 2(1), 3-6.

Chen et al., "Electro-Optical Characteristics of a Twisted Nematic Liquid-Crystal Cell Doped with Carbon Nanotubes in a DC Electric Field," *Opt. Rev.*, 2005, 12(3), 223-225.

Dark et al., "Rotational viscosity and molecular structure of nematic liquid crystals," *Liq. Cryst.*, Jan. 2006, 33(1), 67-73.

Dierking et al., "Aligning and Reorienting Carbon Nanotubes with Nematic Liquid Crystals," *Adv. Mater.*, Jun. 4, 2004, 16(11), 865-869. Available online Apr. 30, 2004.

Dierking et al., "Magnetically steered liquid crystal-nanotube switch," *Appl. Phys. Lett.*, 2005, 87, 233507(1-3).

Dierking, "Liquid crystal-carbon nanotubes dispersions," *J. Appl. Phys.*, 2005, 97, 044309(1-5). Published online Jan. 25, 2005.

Eidenschink et al., "Static scattering in filled nematic: new liquid crystal display technique," *Electron. Lett.*, Jun. 20, 1991, 27(13), 1195-1196.

Elston et al., *The Optics of Thermotropic Liquid Crystals*, Taylor & Francis, Bristol, PA, 1998, cover page, copyright page, and table of contents only; 4 pgs.

Freedericksz et al., "Über die Orientierung anisotroper Flüssigkeiten in dünnen Schichten," *Phys. Z Sow.*, 1934, 6, 490-504.

Frisken et al., "Freedericksz transitions in nematic liquid crystals: The effects of an in-plane electric field," *Phys. Rev. A*, Nov. 15, 1989, 40(10), 6099-6102.

Gaponik et al., "Thiol-Capping of CdTe Nanocrystals: An Alternative to Organometallic Synthetic Routes," *J. Phys. Chem. B*, 2002, 106(29), 7177-7185. Available online Jun. 21, 2002.

Glushchenko et al., "Memory effect in filled nematic liquid crystals," *Liq. Cryst.*, 1997, 23(2), 241-246.

Hegmann et al., "Nanoparticles in Liquid Crystals: Synthesis, Self-Assembly, Defect Formation and Potential Applications," *J Inorg. Organomet. Polym. Mater.*, Sep. 2007, 17(3), 483-508.

Hegmann et al., "Alignment and Electro-Optic Effects of Funcationalized Gold Nanoparticles and CdTe Semiconductor Quantum Dots in Nematic Hosts" abstract, Canadian Society for Chemistry (CSC), Ottawa, Ontario, Canada, 2009, retrieved on May 14, 2009 from the internet <http://abstracts.csc2009.ca/00000289.htm; 1 pg.

Hong et al., "Extraordinarily high-contrast and wide-view liquid crystal displays," *Appl. Phys. Lett.*, 2005, 86, 121107(1-3). Published online Mar. 15, 2005.

Huang et al., "Electrooptical Responses of Carbon Nanotube-Doped Liquid Crystal Devices," *Jpn. J. Appl. Phys.*, Nov. 9, 2005, 44(11), 8077-8081.

Huang et al., "Electrooptical Properties of Carbon-Nanotube-Doped Twisted Nematic Liquid Crystal Cell," *Jpn. J. Appl. Phys.*, Aug. 4, 2006, 45(8A), 6392-6394.

Jeon et al., *Appl. Phys. Lett.*, "Effects of carbon nanotubes on electro-optical characteristics of liquid crystal cell driven by in-plane field," Mar. 2007, 90(12), 121901(1-3).

Jeong et al., "Electroactive Superelongation of Carbon Nanotube Aggregates in Liquid Crystal Medium," *Nano Lett.*, 2007, 7(8), 2178-2182. Available online Jul. 4, 2007.

Khoo, *Liquid Crystals*, $2^{nd}$ ed.; John Wiley & Sons, Hoboken, NJ, 2007, cover page, copyright page, and table of contents; 9 pgs. Available online May 18, 2006.

Kinkead et al., "Effects of size, capping agent, and concentration of CdSe and CdTe quantum dots doped into a nematic liquid crystal on the optical and electro-optic properties of the final colloidal liquid crystal mixture," *J. Mater. Chem.*, 2010, 20(3): 448-458. Available online Nov. 6, 2009 as an Advance Article.

Kreuzer et al., "Erasable optical storage in bistable liquid-crystal cells," *Mol. Cryst. Liq. Cryst.*, 1992, 223, 219-227. First published Jan. 1, 1992.

Lee et al., "Effects of carbon-nanotube doping on the performance of a TN-LCD," *J. Soc. Inf. Disp.*, Sep. 2005, 13(9), 743-747.

Li et al., "Shape and Aggregation Control of Nanoparticles: Not Shaken, Not Stirred," *J. Am. Chem. Soc.*, 2006, 128(3), 968-975. Available online Dec. 31, 2005.

Pradhan et al., "Three-dimensional structure of CdX (X=Se,Te) nanocrystals by total x-ray diffraction," *J. Appl. Phys.*, 2007, 102(4), 044304(1-6).

Qi et al., "Unprecedented Dual Alignment Mode and Freedericksz Transition in Planar Nematic Liquid Crystal Cells Doped with Gold Nanoclusters," *Adv. Funct. Mater.*, Jan. 24, 2008, 18(2), 212-221. Available online Jan. 3, 2008.

Qi et al., "Impact of nanoscale particles and carbon nanotubes on current and future generations of liquid crystal displays," *J Mater. Chem.*, 2008,18(28), 3288-3294.

Qi et al., "Effects of functionalized metal and semiconductor nanoparticles in nematic liquid crystal phases," *Proc. SPIE-Int. Soc. Opt. Eng.*, 2008, 6911, 691106(1-11).

Qi et al., "Miscibility and Alignment Effects of Mixed Monolayer Cyanobiphenyl Liquid-Crystal-Capped Gold Nanoparticles in Nematic Cyanobiphenyl Liquid Crystal Hosts," *ChemPhysChem.*, Jun. 2, 2009, 10(8), 1211-1218. Available online Mar. 30, 2009.

Sage, in *Handbook of Liquid Crystals*, Wiley-VCH, Weinheim, Demus et al. (Eds.), vol. 1, 1998, pp. 731-762.

Schadt, "Liquid crystal materials and liquid crystal displays," *Ann. Rev. Mater. Sci.*, 1997, 27, 305-379.

Song et al., "Nematic Liquid Crystallinity of Multiwall Carbon Nanotubes," Science, Nov. 21, 2003, 302(5649), 1363.

Sonin, *The surface physics of liquid crystals*, 1995, Gordon & Breach, Luxembourg; cover page, copyright page, and table of contents only; 5 pgs.

Tarumi et al., "Recent liquid crystal material development for active matrix displays," *Ann. Rev. Mater. Sci.*, 1997, 27, 423-441.

Toney et al., "Near-surface alignment of polymers in rubbed films," *Nature*, Apr. 20, 1995, 374, 709-711.

Walker et al., "Quantum-dot optical temperature probes," *Appl. Phys. Lett.*, Oct. 27, 2003, 83(17), 3555-3557.

Wang et al., "Correlations between liquid crystal director reorientation and optical response time of a homeotropic cell," *J. Appl. Phys.*, May 15, 2004, 95(10), 5502-5508.

Wu et al., "Physical-properties of chlorinated liquid-crystals," *Liq. Cryst.*, Nov. 5, 1991, 10(5), 635-646.

Yakuphanoglu et al., "Conductance and dielectric anisotropy properties of 4-cyano-4'-hexylbiphenyl-salicylaldimine compound composite liquid crystal exhibiting large positive dielectric anisotropy" *Physica B: Physics of Condensed Matter*, Apr. 30, 2007, 393(1-2), 270-274.

Yaroslavov et al., "What Is the Effective Charge of TGA-Stabilized CdTe Nanocolloids?" *J. Am. Chem. Soc.*, 2005, 127(20), 7322-7323. Available online Apr. 29, 2005.

Zhang et al., "The Influence of Carboxyl Groups on the Photoluminescence of Mercaptocarboxylic Acid-Stabilized CdTe Nanoparticles," *J. Phys. Chem. B*, 2003, 107(1), 8-13. Available online Dec. 10, 2002.

* cited by examiner

LC1 (Felix-2900-03); Cr 52 (SmA 45) N 70 Iso
$\Delta\varepsilon = +0.62$, $V_{th}$(rms) = 6.3 V
(at $T/T_{Iso/N} = 0.95$)

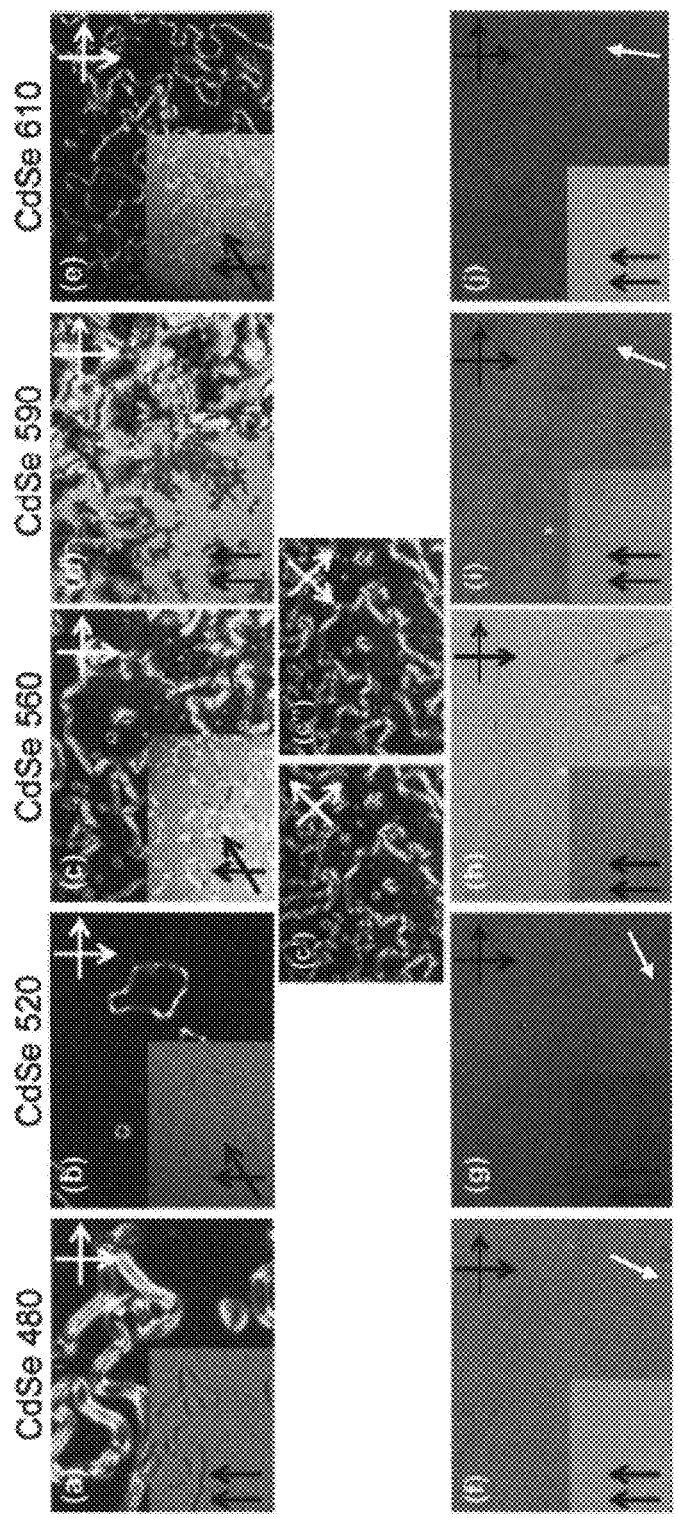
Figures 3a-3i, 3c', and 3c"

PLANAR NEMATIC LIQUID CRYSTAL CELLS DOPED WITH NANOPARTICLES AND METHODS OF INDUCING A FREEDERICKSZ TRANSITION

CROSS-REFERENCES TO RELATED APPLICATIONS

This application claims the benefit of U.S. Provisional Application No. 61/217,336, filed May 29, 2009, herein incorporated by reference in its entirety.

BACKGROUND OF THE INVENTION

Nematic liquid crystals (N-LCs) are one-dimensionally ordered fluids commonly formed by rod-shaped molecules. The response of a nematic liquid crystal (N-LC) to an applied electric field is an important property used in many device and display applications. (Tarumi et al., "Recent liquid crystal material development for active matrix displays," *Ann. Rev. Mater. Sci.,* 1997, 27, 423-441.) The ability of the director (parallel to the long molecular axis for a rod-like N-LC) to align along an external field is caused by, for example, the electric nature of the molecules. In the absence of external perturbations, the director of an N-LC is free to assume any orientation, but may be forced to point into a specific direction using planar (Toney et al., "Near-surface alignment of polymers in rubbed films," *Nature,* 1995, 374, 709-711) or homeotropic alignment layers (Sorin, *The surface physics of liquid crystals,* 1995, Gordon & Breach, Luxembourg). Depending on, for example, initial alignment conditions, sign of the dielectric anisotropy, as well as electric field direction and strength, different director configurations can be induced. (Frisken et al., "Freedericksz transition in nematic liquid crystals: The effects of an in-plane electric field," *Phys. Rev. A,* 1989, 40, 6099-6102 and Wang et al., "Correlations between liquid crystal director reorientation and optical response time of a homeotropic cell," *J. Appl. Phys.,* 2004, 95, 5502-5508.) This may be used to create a potential impact on current LC display technologies and N-LC optical biosensor design.

SUMMARY OF THE INVENTION

According to one aspect of the present disclosure, there is provided a planar nematic liquid crystal cell including: a colloidal suspension that includes: a nematic liquid crystal with positive dielectric anisotropy and cadmium selenide (CdSe) nanoclusters (e.g., CdSe quantum dot ("QD") nanoclusters) that include a pure monolayer (i.e., a monolayer of a single type of ligand) of organic ligands; and one or more optional alignment layers.

According to one aspect of the present disclosure, there is provided a planar nematic liquid crystal cell including: a colloidal suspension that includes: a nematic liquid crystal with positive dielectric anisotropy and cadmium telluride (CdTe) nanoclusters (e.g., CdTe quantum dot ("QD") nanoclusters) that include a pure monolayer (i.e., a monolayer of a single type of ligand) of organic ligands; and one or more optional alignment layers. In such liquid crystal cells, combinations (e.g., mixtures) of CdSe and CdTe nanoclusters are also envisioned.

According to another aspect of the present disclosure, there is provided a method of inducing a Freedericksz transition, the method including: providing a planar nematic liquid crystal cell including: a colloidal suspension that includes: a nematic liquid crystal with positive dielectric anisotropy; and cadmium selenide (CdSe) nanoclusters (e.g., CdSe quantum dot nanoclusters) that include a pure monolayer (i.e., a monolayer of a single type of ligand) of organic ligands; and one or more optional alignment layers; and applying an electric field across the cell to reorient the liquid crystal molecules, wherein the electric field is above the threshold field.

According to another aspect of the present disclosure, there is provided a method of inducing a Freedericksz transition, the method including: providing a planar nematic liquid crystal cell including: a colloidal suspension that includes: a nematic liquid crystal with positive dielectric anisotropy; and cadmium telluride (CdTe) nanoclusters (e.g., CdTe quantum dot nanoclusters) that include a pure monolayer (i.e., a monolayer of a single type of ligand) of organic ligands; and one or more optional alignment layers; and applying an electric field across the cell to reorient the liquid crystal molecules, wherein the electric field is above the threshold field. In such methods, combinations (e.g., mixtures) of CdSe and CdTe nanoclusters are also envisioned.

According to another aspect of the present disclosure, there is provided a method of controlling the alignment of a liquid crystal, the method including: filling a liquid crystal cell including one or more optional alignment layers with a mixture that includes an isotropic liquid crystal and cadmium selenide nanoclusters, wherein the nanoclusters include a pure monolayer (i.e., a monolayer of a single type of ligand) of organic ligands; and cooling the mixture below the liquid crystal isotropic-nematic phase transition temperature.

According to another aspect of the present disclosure, there is provided a method of controlling the alignment of a liquid crystal, the method including: filling a liquid crystal cell including one or more optional alignment layers with a mixture that includes an isotropic liquid crystal and cadmium telluride nanoclusters, wherein the nanoclusters include a pure monolayer of organic ligands; and cooling the mixture below the liquid crystal isotropic-nematic phase transition temperature. In such methods, combinations (e.g., mixtures) of CdSe and CdTe nanoclusters are also envisioned.

Preferably, the nematic liquid crystal is uniaxial, biaxial, or discotic. Exemplary such liquid crystals include Felix-2900-03 or a cyanobiphenyl derivative.

Preferably, the nanoclusters are present in the suspension in an amount of at least 0.1 weight percent (wt-%), and more preferably at least 2 wt-%, based on the total weight of the liquid crystal and nanoclusters.

The terms "comprises" and variations thereof do not have a limiting meaning where these terms appear in the description and claims.

The words "preferred" and "preferably" refer to embodiments of the present disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

As used herein, "a," "an," "the," "at least one," and "one or more" are used interchangeably.

As used herein, the term "or" is generally employed in its sense including "and/or" unless the content clearly dictates otherwise.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the one or more embodiments of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

In the accompanying drawings, which illustrate an exemplary embodiment of the present disclosure:

In FIGS. 2a and 2b, the fluorescence intensity is given in arbitrary units (a.u.) and wavelength is given in nanometers (nm).

FIGS. 3a-3e show POM images of 2 wt-% mixtures of CdSe 480, CdSe 520, CdSe 560, CdSe 590, and CdSe 610 in the nematic phase of LC1 between plain glass slides at $T_{Iso/N}-T=9°$ C. The insets in FIGS. 3a-3e show the same image with parallel (un-crossed) or slightly un-crossed polarizers.

FIGS. 3f-3j show POM images of 2 wt-% mixtures of CdSe 480, CdSe 520, CdSe 560, CdSe 590, and CdSe 610 in the nematic phase of LC1 in planar aligned cells. The insets in FIGS. 3f-3j show the same image with parallel (un-crossed) polarizers. The arrows in the lower right corner of FIGS. 3f-3j show the rubbing direction of the planar cells.

FIGS. 3c' and 3c" show the thin film of the sample shown in FIG. 3c after sample rotation between crossed polarizers 45° to the left and 45° to the right, respectively (evidencing homeotropic alignment of the dark domains).

In FIG. 5a, the scale bar represents 150 micrometers (μm). The insets in FIGS. 5a-5e show the same image with parallel (un-crossed) polarizers.

In FIGS. 6a and 6b, in order of increasing threshold voltage and $K_{11}$, the lines represent 3, 6, 9, 12, and 15 degrees Celsius below Iso. The values for pure LC1 at the same reduced temperatures are shown on the right of each plot for comparison.

FIGS. 13d and 13e show images of both planar and homeotropic alignment domains.

DETAILED DESCRIPTION OF ILLUSTRATIVE EMBODIMENTS OF THE INVENTION

Figure 1:
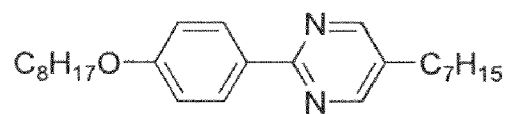
FIG. 1 shows the structure, phase transition behavior and electro-optic properties of pure LC1 (Felix-2900-03).

The present disclosure provides nematic liquid crystal cells including colloidal suspensions (i.e., dispersions) that include N-LCs with positive dielectric anisotropy doped with nanoclusters (i.e., nanoparticles). For example, nanoclusters (e.g., CdSe nanoclusters, CdTe nanoclusters), having a pure monolayer of organic ligands, doped into N-LCs with positive dielectric anisotropy may give rise to a dual alignment mode and electro-optic response with a potential impact on current LC display technologies and N-LC optical biosensor design. By fine-tuning of experimental conditions (temperature, electric field, alignment), N-LCs doped with nanoclusters (e.g., CdSe nanoclusters, CdTe nanoclusters) can be electrically reoriented and aligned either like N-LCs with a positive dielectric anisotropy in a planar cell or alternatively as N-LCs with a negative dielectric anisotropy in a homeotropic cell.

Some embodiments of the present disclosure provide an N-LC cell that includes a colloidal suspension of a nematic liquid crystal and cadmium selenide nanoclusters. Some embodiments of the present disclosure provide an N-LC cell that includes a colloidal suspension of a nematic liquid crystal and cadmium telluride nanoclusters. Some embodiments include combinations (e.g., mixtures) of nanoclusters. A colloidal suspension may include a non-chiral nematic liquid crystal. The cadmium selenide nanoclusters and cadmium telluride nanoclusters include a pure monolayer of organic ligands (i.e., a monolayer of a single type of ligand).

In one or more embodiments, the cadmium selenide nanoclusters may be cadmium selenide quantum dots. In one or more embodiments, the cadmium telluride nanoclusters may be cadmium telluride quantum dots. A "quantum dot" is a semiconductor nanoparticle that can confine the motion of electrons or holes in all three spatial dimensions. In contrast, for example, quantum wires confine the motion of electrons in two spacial dimensions while allowing free movement in the third dimension. Quantum dots may be made by, for example, colloidal synthesis, electrochemical techniques, or pyrolytic synthesis. "Nanocluster" and "nanoparticle," as used herein, are synonymous and include, but are not limited to, quantum dots (e.g., CdSe quantum dots, CdTe quantum dots). Such N-LC cells that include the colloidal suspensions (i.e., dispersions) described herein may be used in, for example, an optical device or a switch. Such cells can be used to induce a Freedericksz transition upon the application of an electric field (whether it be alternating or direct current). The electric field used to induce a Freedericksz transition may be of varying frequency or varying wave form. A description of Freedericksz transitions and a discussion of various doped liquid crystal cells capable of Freedericksz transitions may be found in, for example, International (PCT) Patent Application Publication No. WO 2008/134866 A1 (Hegmann et al.) and the documents cited therein.

A variety of suitable liquid crystal cells are suitable for one or more embodiments of the present disclosure. Such cells may or may not include alignment layers. For example, a suitable cell may simply include glass (e.g., only for changing alignment) with a layer of indium tin oxide (ITO) (e.g., the liquid crystal cell includes two parallel glass substrates forming a gap whose inner surfaces are covered with ITO electrodes). Alternatively, a suitable cell can include ITO and a polyimide alignment layer (e.g., with alignment layers of 1-3 degree pre-tilt). Examples of the latter are, for example, commercially available from Displaytech Inc. and Instec. Preferred cells are planar alignment cells with cell gaps of less than 7.0 microns. Commercially available cells may include a cell gap of, for example, 4.0, 5.0, and 6.8 microns. Preferably, the cell includes a cell gap of no greater than 6.8 microns with a particularly preferred cell gap of 5.0 microns. In one or more embodiments, a cell gap of 9.0 microns may not produce the different (i.e., homeotropic) alignment at lower particle concentrations (e.g., about 5 wt-% or less).

In one or more embodiments, the nematic liquid crystal in the colloidal suspension may optionally be a non-chiral nematic liquid crystal. Examples of non-chiral nematic liquid crystals include uniaxial, biaxial, or discotic N-LCs. In one or more preferred embodiments, the liquid crystal may be Felix-2900-03, a cyanobiphenyl derivative, or other nematic LCs or LC mixtures. In certain embodiments, a cyanobiphenyl derivative includes, but is not limited to, 4'-n-pentyl-4-cyanobiphenyl (5CB), 4'-n-octyl-4-cyanobiphenyl (8CB), or 4'-n-octyloxy-4-cyanobiphenyl (8OCB). The structures of Felix-2900-3, 5CB, and 8CB are shown here:

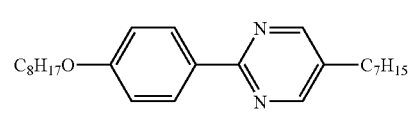

Felix-2900-03

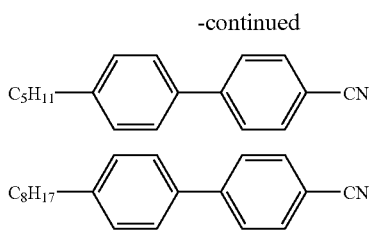

(Dark et al., "Rotational viscosity and molecular structure of nematic liquid crystals," *Liq.* 2006, 33, 67-73.)

Table 1 provides the phase transition temperatures, dielectric anisotropy values of some nematic liquid crystals suitable for one or more embodiments of the present disclosure.

TABLE 1

| N-LC | Phase Transition Temperatures | Dielectric Anisotropy Values | Threshold Field $V_{th}$(rms) |
|---|---|---|---|
| Felix-2900-3 | Cr 52 (SmA 45) N 70 Iso | $\Delta\epsilon = 0.62$** | 6.3** |
| 5CB | Cr 22.5 N 35 Iso | $\Delta\epsilon = 11.0$* | 0.7* |
| 8CB | Cr 22 SmA 32.5 N 40 Iso | $\Delta\epsilon = 7.7$** | 1.35** |

*at $T/T_{Iso} = 0.965$
**at $T/T_{Iso} = 0.95$ (Abe et al., "Dielectric and fluorescence study on phase transitions in liquid crystal 5CB and 8CB", *J. Korean Phys. Soc.*, 2005, 46, 220-223.) As used herein, $T_{Iso}$ represents the isotropic-nematic phase transition temperature, which is also referred to herein as the "clearing point."Other symbols for this parameter, such as $T_{Iso-N}$, $T_{Iso/N}$, and $T_{N1}$, will be apparent to those skilled in the art.

In one or more embodiments of the present disclosure, the nematic liquid crystal in the colloidal suspension may optionally be a chiral nematic liquid crystal. Such a chiral nematic liquid crystal (N*-LC) may be intrinsically chiral (i.e., including chiral nematic liquid crystal molecules) or may be liquid crystal having a chiral phase induced via a chiral dopant. In one or more embodiments, the nematic liquid crystal may include a pure nematic liquid crystal or mixtures of nematic liquid crystals. Such nematic liquid crystals or mixtures of nematic liquid crystals may have positive dielectric anisotropy (i.e., $\Delta\epsilon>0$) or negative dielectric anisotropy (i.e., $\Delta\epsilon<0$), as are further described herein.

In one or more embodiments of the present disclosure, the colloidal suspensions include no greater than 10 percent by weight (wt-%) nanoclusters (e.g., CdSe nanoclusters, CdTe nanoclusters), based on the total weight of the liquid crystal and nanoclusters. Preferably, the colloidal suspension includes no greater than 9 wt-% nanoclusters, more preferably no greater than 8 wt-%, even more preferably no greater than 7 wt-%, and even more preferably no greater than 6 wt-%, based on the total weight of the liquid crystal and nanoclusters. Preferably, the colloidal suspension includes at least 0.1 wt-% nanoclusters (e.g., CdSe nanoclusters, CdTe nanoclusters), more preferably at least 0.5 wt-%, even more preferably at least 1 wt-%, even more preferably at least 2 wt-%, even more preferably at least 3 wt-%, even more preferably at least 3.5 wt-%, even more preferably at least 4 wt-%, and even more preferably at least 5 wt-%, based on the total weight of the liquid crystal and nanoclusters. In certain embodiments, the amount of nanoclusters is from 1 wt-% to 10 wt-%, from 1 wt-% to 9 wt-%, from 1 wt-% to 8 wt-%, from 1 wt-% to 7 wt-%, from 1 wt-% to 6 wt-%, from 2 wt-% to 6 wt-%, from 3 wt-% to 6 wt-%, from 2 wt-% to 5 wt-%, from 2 wt-% to 4 wt-%, from 2 wt-% to 3.5 wt-%, from 2 wt-% to 3 wt-%, or from 4 wt-% to 5 wt-%, based on the total weight of the liquid crystal and nanoclusters. A concentration of nanoclusters of greater than 10 wt-% may result in undesirable aggregation.

The average size (i.e., largest dimension of a cluster, which is the diameter of a sphere) of the nanoclusters (e.g., CdSe nanoclusters, CdTe nanoclusters) described herein is no greater than 10 nanometers (nm). Unless otherwise noted herein, the average size of nanoclusters provided is the average size of the cores (e.g., CdSe cores, CdTe cores) of the nanoclusters, wherein the measurement of size does not include the ligands attached to the cores. The average size of nanoclusters can be measured using techniques that utilize, for example, x-ray scattering and/or transmission electron microscopy. Preferably, the average size of nanoclusters (e.g., CdSe nanoclusters, CdTe nanoclusters) is no greater than 9 nm, more preferably no greater than 8 nm, even more preferably no greater than 7 nm, even more preferably no greater than 6 nm, and even more preferably no greater than 5.5 nm. Preferably, the average size of the nanoclusters (e.g., CdSe nanoclusters, CdTe nanoclusters) is at least 1 nm and more preferably at least 2 nm. For certain embodiments, the average size is from 1 nm to 10 nm, from 1 nm to 9 nm, from 1 nm to 8 nm, from 1 nm to 7 nm, from 1 nm to 6 nm, from 2 nm to 6 nm, from 2 nm to 5 nm, from 2 nm to 4 nm, and from 3 nm to 4 nm. An average size of nanoclusters of greater than 10 nm may result in undesirable settling of the nanoclusters.

The nanoclusters (e.g., CdSe nanoclusters, CdTe nanoclusters) include ligands having organic groups. In the present disclosure, the ligands on a nanocluster may collectively provide, for example, a pure monolayer of organic ligands, as described below. For the present disclosure, the organic groups may be non-chiral groups.

In one or more embodiments, a ligand (e.g., a ligand attached to a nanocluster) including an organic group may include an aliphatic group (e.g., $C_4$-$C_{18}$ alkyl group). In one or more embodiments, CdSe nanoclusters may include organic groups having one or more nitrogen atoms (e.g., a nitrogen atom bonded to the CdSe nanocluster). For example, CdSe nanoclusters may include organic groups having one or more amine groups (e.g., alkylamine groups). For example, CdSe nanoclusters may include $C_4$-$C_{18}$ amine groups that are preferably hexadecylamine groups. In one or more embodiments, an organic ligand may be an apolar ligand, such as hexadecylamine. In one or more embodiments, an apolar ligand may be a ligand having a carboxylic acid group with the carboxylate group binding to the nanocluster.

In one or more embodiments, a ligand including an organic group (e.g., an organic ligand) may include a polar organic group. For example, a ligand including a polar organic group may include a carboxylic acid group (e.g., a terminal carboxylic acid group). In one or more embodiments, CdTe nanoclusters may include organic groups having one or more sulfur atoms (e.g., a sulfur atom bonded to the CdTe nanocluster). In one or more embodiments, a ligand including an organic group (e.g., an organic ligand) may include a thioglycolic acid group (—S—$CH_2$—COOH) (e.g., a thioglycolic acid ligand). In one or more embodiments, a CdTe nanocluster may include a pure monolayer of thioglycolic acid ligands.

As used herein, a nanocluster having a "pure monolayer" is a nanocluster having a core with a single type of ligand. A nanocluster having a "mixed monolayer" is a nanocluster having a core with ligands that are not all the same. Preferably, each individual core is completely covered (i.e., completely functionalized) with ligands. As used herein, "completely covered" means coated with a monolayer of ligands.

As used herein, a nanocluster (e.g., CdSe nanocluster, CdTe nanocluster) that is "capped" is a nanocluster having a core (e.g., CdSe core, CdTe core) completely covered with a monolayer that includes one specified ligand or ligand group. For example, a hexadecylamine-capped nanocluster is a nanocluster having a core completely covered with hexadecylamine ligands. In another example, an organic-capped nanocluster is a nanocluster having a core completely covered with organic ligands. However, as used herein, a nanocluster that is "capped with a mixed monolayer" may be a nanocluster having a nanocluster core completely covered with a specified ligand or ligand group in a mixed monolayer that further includes, for example, a second (and/or third, etc.) specified ligand or ligand group.

In certain embodiments, liquid crystal cells, using nematic liquid crystals (in certain embodiments, non-chiral nematic liquid crystals) and non-chiral nanoclusters (i.e., nanoclusters with non-chiral ligands) can be used to induce a Freedericksz transition upon the application of an electric field. The electric field can be of a variety of wave forms and a variety of frequencies. In one or more embodiments of the present disclosure, the applied electric field is above the threshold electric field. Herein, the threshold voltage is the voltage at which a 5% change in capacitance of the liquid crystal mixture occurs. The applied electric field may be applied across the cell in order to reorient the LC molecules.

In one embodiment, the present disclosure provides a method of inducing a Freedericksz transition that includes providing a nematic liquid crystal cell and applying an electric field that is above the threshold field across the cell to reorient the LC molecules. The electric field may be of varying frequency or varying wave form. The nematic liquid crystal cell may be planar and may have a cell gap of less than 7.0 microns. According to one or more embodiments, a planar nematic liquid crystal cell includes a colloidal suspension and may or may not include alignment layers. In some embodiments, a colloidal suspension may include a nematic liquid crystal with positive dielectric anisotropy and nanoclusters (e.g., CdSe nanoclusters, CdTe nanoclusters).

Figures 2A, 2B:
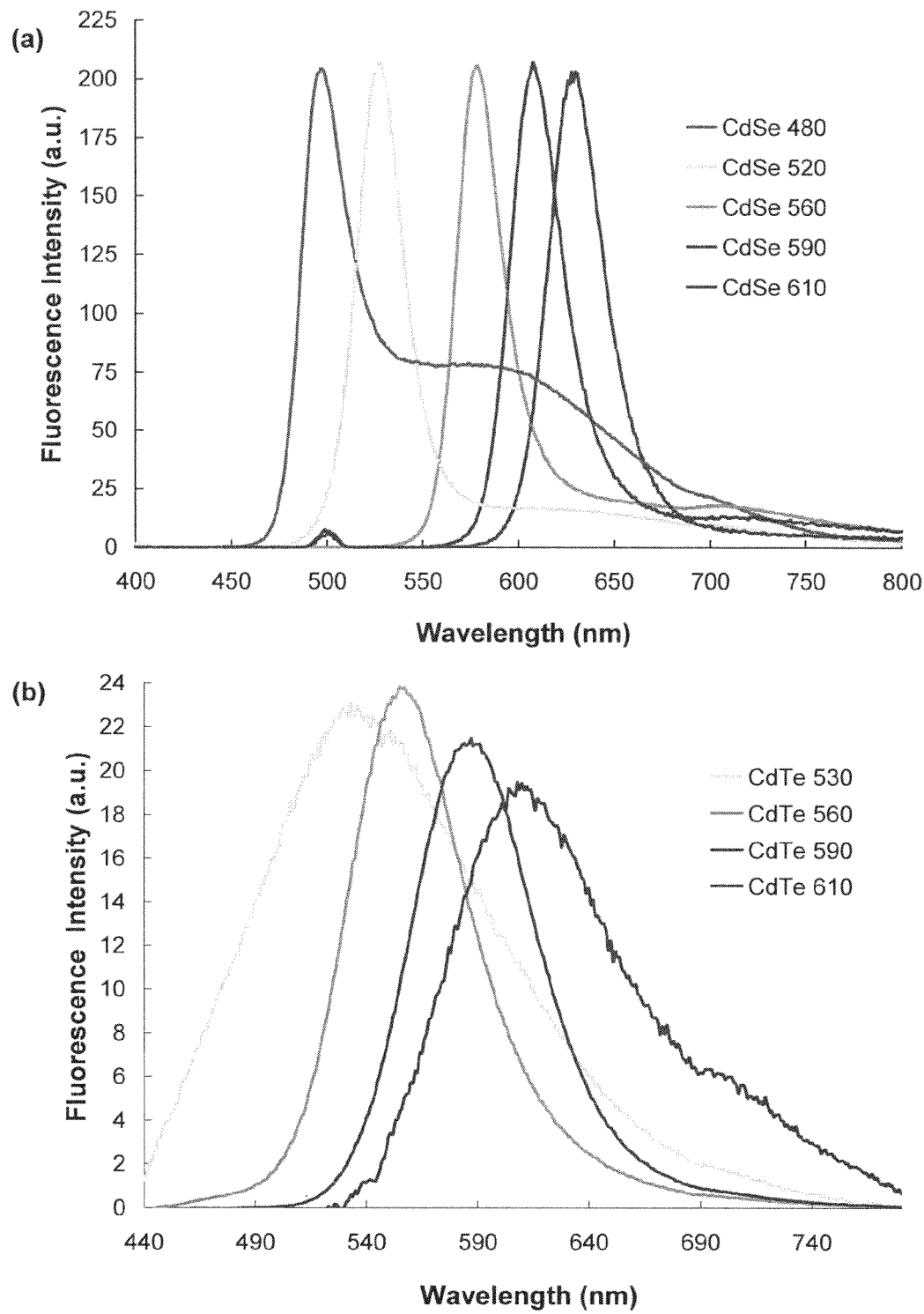
FIGS. 2a and 2b show the fluorescence spectra of the size-separated CdSe quantum dots (QDs) in toluene (FIG. 2a) and the size-separated CdTe quantum dots (QDs) in water (FIG. 2b).

The N-LC phase is characterized by molecules that have no positional order but tend to orient, on the time average, in the same direction (along the director, n). (See, e.g., FIG. 2 in Int'l Pat. Pub. No. WO 2008/134866 A1 (Hegmann et al.)) Two major types of N-LCs can be distinguished that are currently used in different LC display technologies. N-LC molecules can possess a permanent or induced dipole either along (used in twisted nematic, TN cells (Schadt, "Liquid crystal materials and liquid crystal displays," *Ann. Rev. Mater. Sci.*, 1997, 27, 305-379)) or across the long molecular axis (used in vertical alignment, VA mode displays) (Hong et al., "Extraordinarily high-contrast and wide-view liquid crystal displays," *Appl. Phys. Lett.*, 2005, 86, 121107 (1-3)). Upon applying an electric field above a certain electric field threshold ($E > E_{th}$), if the dipole moment, $\mu$, is parallel (or almost parallel) to the long molecular axis, then the N-LC possesses positive dielectric anisotropy, $\Delta \in > 0$ (i.e., $\in_\| > \in_\perp$), and the director tends to orient along the electric field, E, direction. If the molecules' dipole moments, $\mu$, are more or less normal to the long molecular axis, the N-LC possesses a negative dielectric anisotropy, $\Delta \in < 0$ (i.e., $\in_\| < \in_\perp$), and the director tends to orient perpendicular to E. (Int'l Pat. Pub. No. WO 2008/134866 A1 (Hegmann et al.))

The orientational order of the N-LC molecules does not change in an applied electric field, but the collective response to E causes a director reorientation (or distortion). Hence, the larger the dielectric anisotropy, $\Delta \in$, the smaller electric field is needed to reorient the molecules. This competition between different director orientations produced by surface anchoring (planar using polyimide alignment layers, or homeotropic using surfactants) and electric field effects (Intl Pat. Pub. No. WO 2008/134866 A1 (Hegmann et al.)) is in fact what is greatly exploited in LC display and other optical devices. (Schadt, "Liquid crystal materials and liquid crystal displays," *Ann. Rev. Mater. Sci.*, 1997, 27, 305-379 and Hong et al., "Extraordinarily high-contrast and wide-view liquid crystal displays,"*Appl. Phys. Lett.*, 2005, 86, 121107(1-3).) The occurrence of such a change from an aligned to a deformed state, which can also be produced by applying a magnetic field of sufficient strength, is termed Freedericksz transition (Freedericksz et al., "Über die Orientierung anisotroper Flüssigkeiten in dünnen Schichten," *Phys. Z. Sow.*, 1934, 6, 490-504) and led to the discovery of so-called quasi-Freedericksz type displays (Sage, In *Handbook of Liquid Crystals*, 1998, Wiley-VCH, Weinheim, Demus et al. (Eds.), vol. 1, pp. 731-762).

A further description of the response of an N-LC to an applied electric field may be found in, for example, International (PCT) Patent Application Publication No. WO 2008/134866 A1 (Hegmann et al.) and the documents cited therein.

The resistivity of a liquid crystal may be reduced by the addition of CdTe quantum dots and/or CdSe quantum dots. Resistivity of a liquid crystal may be measured at any temperature. Resistivity may be measured at, for example, any temperature below the phase transition temperature (e.g., $T_{Iso/N}-T=3, 6, 9, 12, 15°$ C. or other temperatures). For example, in one or more embodiments of the present disclosure, doping of a liquid crystal may reduce the resistivity of the liquid crystal by 50 percent or greater. In one or more embodiments, the reduction in resistivity may be 60 percent or greater, 70 percent or greater, 80 percent or greater, 90 percent or greater, and/or 95 percent or greater. In some embodiments, the resistivity may be greater than 2.5 gigaohms (G$\Omega$). In some embodiments, the resistivity may be 2% or greater of the resistivity of the pure liquid crystal. In some embodiments, the resistivity may be 5% or greater, 10% or greater, 15% or greater, 20% or greater, 25% or greater, and/or 30% or greater of the resistivity of the pure liquid crystal.

CdSe quantum dots in toluene may be commercially available from Sigma-Aldrich (St. Louis, Mo.). The CdSe quantum dots may have fluorescence emission maxima from about 480 nm to 610 nm, and may be varied in size from about 2.5 to about 5.2 nm. CdSe QDs may be surface stabilized with, for example, hexadecylamine (e.g., CdSe quantum dots may have a pure monolayer of hexadecylamine).

CdTe quantum dots may be synthesized and size-separated as disclosed by Gaponik et al. (Gaponik et al., "Thiol-Capping of CdTe Nanocrystals: An Alternative to Organometallic Synthetic Routes," *Phys. Chem. B*, 2002, 106, 7177-7185; Zhang et al., "The Influence of Carboxyl Groups on the Photoluminescence of Mercaptocarboxylic Acid-Stabilized CdTe Nanoparticles," *J. Phys. Chem. B*, 2003, 107, 8-13.) CdTe QDs may be all capped with, for example, a thioglycolic acid (TGA) capping agent (ranging in size from about 3.2 nm to about 4.0 nm with fluorescence emission maxima of from about 530 nm to 610 nm, respectively) and dispersed in water. In some embodiments, CdTe QDs may have a size outside of 3.2 nm to 4.0 nm and may have fluorescence emission maxima of outside the range of 530 nm to 610 nm. Because of degradation issues, the CdTe QDs may be used by determining the concentration of the stock solutions (by measuring the difference in weight between the QD-containing solutions and pure water of equal volume) and dissolving the amount of QDs desired for the mixture in an excess of methanol in order to allow dissolution in toluene.

The mixtures of the CdSe quantum dots in a liquid crystal (e.g., phenylpyrimidine LC1 (available from Synthon Chemicals GmbH (Wolfen, Germany)) may be made by weighing suitable amounts of the solid liquid crystal using a micro-balance and dissolving it in a known amount of a solvent (e.g., toluene). The solvent (e.g., toluene) solutions of the CdSe QDs may then be combined in, for example, a V-vial with the LC to produce a desired concentration of QDs in the liquid crystal (e.g., LC1) (wt-% mixtures). The solvent may then be allowed to evaporate (e.g., under a steady stream of nitrogen at about 40 to 70° C. for about 24 to 48 hours). The mixtures of the CdTe quantum dots in a liquid crystal (e.g., phenylpyrimidine LC1 (available from Synthon Chemicals GmbH (Wolfen, Germany)) may be made by weighing suitable amounts of the solid liquid crystal using a micro-balance and dissolving it in a known amount of a solvent (e.g., methanol/water). The solvent (e.g., methanol/water) solutions of the CdTe QDs may then be combined in, for example, a V-vial with the LC to produce a desired concentration of QDs in the liquid crystal (e.g., LC1) (wt-% mixtures). The solvent may then be allowed to evaporate (e.g., under a steady stream of nitrogen at about 40 to 70° C. for about 24 to 48 hours.)

In one or more embodiments, a method of controlling the alignment of a liquid crystal is presented. The method includes filling a liquid crystal cell as described herein with a mixture that includes a liquid crystal (e.g., a liquid crystal or a mixture of liquid crystals) in the isotropic phase and nanoclusters (CdSe nanoclusters, CdTe nanoclusters) having a pure monolayer of organic ligands. The method further includes cooling the mixture below the liquid crystal isotropic-nematic phase transition temperature to form a colloidal suspension. In such a method, the liquid crystal cell may include one or more optional alignment layers. In certain embodiments, the alignment of a liquid crystal may be controlled by adding nanoclusters to the liquid crystal, as described herein, which may provide flexibility in the manufacture of liquid crystal cells and, for example, LC devices and displays. For example, the alignment of a liquid crystal that can have a planar alignment may be controlled by the addition of nanoclusters (e.g., CdSe, CdTe) to have a homeotropic (vertical) alignment, which may reorient at lower threshold voltages in comparison to the pure liquid crystal.

The liquid crystal cells of the present disclosure may be advantageously used in a wide variety of applications in which liquid crystals are used. Liquid crystal cells having nanoclusters as described herein may require, for example, a reduced energy input (i.e., reduced voltage) to effect a Freedericksz transition, relative to a liquid crystal cell without nanoclusters. For example, a liquid crystal cell of the present disclosure may be used in an electro-optical device or a switch, wherein the device or switch may require, for example, less energy to effect a Freedericksz transition than a device or switch having a liquid crystal cell without nanoclusters. In one or more embodiments, a reduced energy input may be required to switch a pixel of a liquid crystal display on or off. A method of reducing the amount of electric field required for effecting a Freedericksz transition in a nematic cell can include adding nanoclusters to a liquid crystal cell in the isotropic phase, disposing the mixture of liquid crystal and nanoclusters in a liquid crystal cell, and cooling the liquid crystal to the nematic phase.

A method of reducing the intensity of the threshold electric field for effecting a Freedericksz transition of a nematic liquid crystal cell can include adding (e.g., doping) nanoparticles (e.g., CdSe nanoparticles, CdTe nanoparticles), as described herein, to a liquid crystal. Reducing the threshold electric field for a Freedericksz transition may reduce the amount of electric power required for one or more applications (e.g., to switch a liquid crystal pixel on or off) that use a liquid crystal cell of the present disclosure.

In one or more embodiments, the methods of the present disclosure may reduce the intensity of backlight required by a liquid crystal display having a nematic liquid crystal that includes nanoparticles (e.g., CdSe nanoparticles, CdTe nanoparticles).

Particle doped liquid crystalline materials have properties making them useful for, for example, liquid crystal display (LCD) technologies. Nanoparticle dopants can introduce effects such as increased efficiency, altered alignment, and faster switching speeds. (Qi et al., "Impact of nanoscale particles and carbon nanotubes on current and future generations of liquid crystal displays," *J. Mater. Chem.*, 2008, 18, 3288-3294; Hegmann et al., "Nanoparticles in Liquid Crystals: Synthesis, Self-Assembly, Defect Formation and Potential Applications,"*J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221; Eidenschink et al., "Static scattering in filled nematic: new liquid crystal display technique," *Electron. Lett.*, 1991, 27, 1195-1196; Kreuzer et al., "Erasable optical storage in bistable liquid-crystal cells," *Mol. Cryst. Liq. Cryst.*, 1992, 222, 219-227; Glushchenko et al., "Memory effect in filled nematic liquid crystals," *Liq. Cryst.*, 1997, 23, 241-246.)

Some research in the area of liquid crystals (LCs) has focused on nanoparticle-LC mixtures for a variety of purposes, including template synthesis of nanoparticles, nanoparticle ordering, or for nanoparticle induced LC properties. (Qi et al., "Impact of nanoscale particles and carbon nanotubes on current and future generations of liquid crystal displays," *J. Mater. Chem.*, 2008, 18, 3288-3294; Hegmann et al., "Nanoparticles in Liquid Crystals: Synthesis, Self-Assembly, Defect Formation and Potential Applications," *J. Inorg. Organomet. Polym. Mater.*, 2007, 17, 483-508.) Nanomaterials, defined as materials that have at least one dimension being of 1 to 100 nm, show some properties different from those of atoms and bulk materials. This may mean that the introduction of these materials induces effects that may not be realized by the addition of single atoms or bulk materials. (Qi et al., "Impact of nanoscale particles and carbon nanotubes on current and future generations of liquid crystal displays,"*J. Mater. Chem.*, 2008, 18, 3288-3294; Hegmann et al., "Nanoparticles in Liquid Crystals: Synthesis, Self-Assembly, Defect Formation and Potential Applications," *J. Inorg. Organomet. Polym. Mater.*, 2007, 17, 483-508.) One or more embodiments may relate to the preparation of LC nanocomposites for study of the induced effects of either CdSe or CdTe quantum dots on the properties of a nematic LC host (LC1). Nanoparticles have been shown to induce effects such as homeotropic alignment in nematic phases (in the absence of alignment layers), reduced elastic energy, and a variety of topological defects. (Qi et al., "Impact of nanoscale particles and carbon nanotubes on current and future generations of liquid crystal displays," *J. Mater. Chem.*, 2008, 18, 3288-3294; Hegmann et al., "Nanoparticles in Liquid Crystals: Synthesis, Self-Assembly, Defect Formation and Potential Applications,"*J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221; Eidenschink et al., "Static scattering in filled nematic: new liquid crystal display technique," *Electron. Lett.*, 1991, 27, 1195-1196; Kreuzer et al., "Erasable optical storage in bistable liquid-crystal cells," *Mol. Cryst. Liq. Cryst.*, 1992, 222, 219-227; Glushchenko et al., "Memory effect in filled nematic liquid crystals," *Liq. Cryst.*, 1997, 23, 241-246.) In one or more embodiments, LC nanocomposites may be prepared and studied via polarized optical microscopy (POM) and electro-optic analysis to determine whether the quantum dot size, concentration, composition, and miscibility have an effect on the electro-optic properties of a nematic LC host.

In one or more embodiments, either CdTe or CdSe quantum dots (QDs) that have been stabilized and functionalized by an organic capping agent may be doped into nematic liquid crystals. It has been shown that gold nanoparticles can affect optic and electro-optic properties in dispersion with nematic LC hosts. (Qi et al., "Impact of nanoscale particles and carbon nanotubes on current and future generations of liquid crystal displays," *J. Mater. Chem.*, 2008, 18, 3288-3294; Hegmann et al., "Nanoparticles in Liquid Crystals: Synthesis, Self-Assembly, Defect Formation and Potential Applications," *J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221.) CdTe and/or CdSe QDs may be used because they may have the ability to be relatively easily size-separated into batches containing mostly monodisperse QDs. (Gaponik et al., "Thiol-Capping of CdTe Nanocrystals: An Alternative to Organometallic Synthetic Routes," *Phys. Chem. B*, 2002, 106, 7177-7185; Asta et al., "Inorganic Nanoparticles—Unique Properties and Novel Applications," *Material Matters*, 2007, 2, 3-6.) These semiconducting QDs may exhibit size-dependent electronic properties, i.e. fluorescence, due to well known quantum confinement effects. As the QDs decrease in size, there may be an increase in the energy of the band gap as the electrons become confined. Although not wishing to be bound by theory, this may mean that the smallest QDs may emit light with the shortest wavelengths (highest energy), as governed by its band gap. (Asta et al., "Inorganic Nanoparticles—Unique Properties and Novel Applications," *Material Matters*, 2007, 2, 3-6.) This may enable the use of fluorescence spectroscopy of a solution of these quantum dots to determine the relative size of the particles using the emission wavelength and the relative size distribution using the full width at half maximum (FWHM) of the emission peak. (Gaponik et al., "Thiol-Capping of CdTe Nanocrystals: An Alternative to Organometallic Synthetic Routes," *Phys. Chem. B*, 2002, 106, 7177-7185; Asta et al., "Inorganic Nanoparticles—Unique Properties and Novel Applications," *Material Matters*, 2007, 2, 3-6.)

LC1 (i.e., Felix-2900-3) may display a positive dielectric anisotropy ($\Delta \in =0.62$); meaning that the material may have directional polarizability. When voltage is passed through the LC material in the nematic phase above a certain threshold voltage (defined by parameters such as viscosity and dielectric anisotropy) the individual molecules in the bulk will re-orient so that the induced or permanent dipole moment of the molecules is parallel to the applied electric field. (Hegmann et al., "Nanoparticles in Liquid Crystals: Synthesis, Self-Assembly, Defect Formation and Potential Applications," *J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221.) This alignment change, and the parameters that govern it, may be measured using electro-optic analysis. (Hegmann et al., "Nanoparticles in Liquid Crystals: Synthesis, Self-Assembly, Defect Formation and Potential Applications," *J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221; Elston et al., *The Optics of Thermotropic Liquid Crystals*. Taylor & Francis: 1998.) LC samples may be loaded into cells for electro-optic analysis, wherein the cells may include, for example, two glass substrates coated with a transparent indium tin oxide (ITO) conducting layer and a rubbed polyimide alignment layer and may be placed together with a gap spacing in the micrometer (μm) range. The dielectric anisotropy is the difference between parallel and perpendicular permittivity (polarization), thus, if the material has larger permittivity along the long molecular axis it will have positive dielectric anisotropy ($\Delta \in$), and a negative $\Delta \in$ if the short molecular axis has larger permittivity. These two categories of materials (positive and negative dielectric anisotropy materials) respond to an electric field in different ways. For materials with a positive $\Delta \in$ (the majority of nematics falls into this group) such as LC1, the material may begin with planar alignment, which may be induced by a rubbed polyimide alignment layer, and may change to homeotropic (vertical) alignment upon application of an electric field across the cell. For materials with a negative dielectric anisotropy, the material may begin with homeotropic alignment, typically induced by, for example, a surfactant or self-assembled monolayer, and planar alignment may be induced upon application of an electric field. In both cases, the material may begin with the induced or permanent dipole moment of the molecules being aligned perpendicular to the direction of the applied field and may undergo an alignment change to reorient the dipole moment parallel to the electric field once it has been applied. For analysis, a potential may be applied between the glass slides of the loaded cell and the capacitance of the material as a function of voltage may be measured. The C-V (Capacitance-Voltage) plot obtained may enable the determination of the electro-optic parameters. (Hegmann et al., "Nanoparticles in Liquid Crystals: Synthesis, Self-Assembly, Defect Formation and Potential Applications," *J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221; Khoo, *Liquid Crystals*. 2 ed.; Wiley: 2007; Elston et al., *The Optics of Thermotropic Liquid Crystals*. Taylor & Francis: 1998; Yakuphanolglu et al., "Conductance and dielectric anisotropy properties of 4-cyano-4'-hexylbiphenyl-salicylaldimine compound composite liquid crystal exhibiting large positive dielectric anisotropy" *Physica B: Physics of Condensed Matter,* 2007, 393, 270-274.)

The response of LC materials to applied potential may be useful in the use of these materials in display technology. Though different display technologies may use different LC materials and the switching modes may differ between display types, the ON and OFF state of each pixel always relies on a potential being applied through the LC material to produce an alignment change. (Qi et al., "Impact of nanoscale particles and carbon nanotubes on current and future generations of liquid crystal displays," *J. Mater. Chem.*, 2008, 18, 3288-3294.) It may be useful if the LC material of interest for a display technology has a reduced (e.g., minimized) threshold voltage and an increased (e.g., maximized) dielectric anisotropy (in the positive or negative direction). Reducing the threshold voltage is important for improving the efficiency of the display, i.e., reduce power consumption. If less voltage is required to switch the material in the pixels of a display between an ON and OFF states, the display may be more energy efficient. The threshold voltage is typically measured as the voltage at which a 5% change in capacitance occurs. The dielectric anisotropy and the elastic constants of the nematic LC govern the slope of the C-V plot. (Hegmann et al., "Nanoparticles in Liquid Crystals: Synthesis, Self-Assembly, Defect Formation and Potential Applications," *J. Inorg. Organomet. Polym. Mater.*, 2007, 17, 483-508; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221; Elston et al., *The Optics of Thermotropic Liquid Crystals.* Taylor & Francis: 1998; Yakuphanolglu et al., "Conductance and dielectric anisotropy properties of 4-cyano-4'-hexylbiphenyl-salicylaldimine compound composite liquid crystal exhibiting large positive dielectric anisotropy" *Physica B: Physics of Condensed Matter*, 2007, 393, 270-274.) The splay elastic constant ($K_{11}$) may be useful for the used cell geometry because the splay deformation (movement from planar to vertical) is the deformation that occurs when an electric field is applied to the nematic LC.

The splay elastic constant ($K_{11}$) is derived from the equation $$K_{11}=(V_{th}/\pi)^2 \Delta\in\in_o \qquad (\text{eq. 1})$$

where $V_{th}$ is the threshold voltage, $\Delta\in$ is the dielectric anisotropy, and $\in_o$ is the permittivity of free space (a constant). The dependence of $K_{11}$ on the $\Delta\in$ of the material makes it proportional to the slope of the C-V plot. (Elston et al., *The Optics of Thermotropic Liquid Crystals.* Taylor & Francis: 1998; Yakuphanolglu et al., "Conductance and dielectric anisotropy properties of 4-cyano-4'-hexylbiphenyl-salicylaldimine compound composite liquid crystal exhibiting large positive dielectric anisotropy" Physica B: Physics of Condensed Matter, 2007, 393, 270-274.)

Using dopants to alter the properties of the nematic LC host is an area of research. (Qi et al., "Impact of nanoscale particles and carbon nanotubes on current and future generations of liquid crystal displays," *J. Mater. Chem.*, 2008, 18, 3288-3294.) For examples, the nanoparticles described herein may be used to alter the properties of a liquid crystal in a wide variety of applications. Further, it is envisioned that additives (e.g., chiral dopants) may also be used, provided the additives do not interfere with the activity of the nanoclusters (e.g., CdSe and/or CdTe nanoclusters) described herein. Some studies have focused on defect formation induced by materials that were not necessarily at the nanoscale, such as aerosils. These particles were shown to produce a large number of defects, resulting in intense light scattering of the mixture in the non-aligned state. (Qi et al., "Impact of nanoscale particles and carbon nanotubes on current and future generations of liquid crystal displays," *J. Mater. Chem.*, 2008, 18, 3288-3294; Eidenschink et al., "Static scattering in filled nematic: new liquid crystal display technique," *Electron. Lett.*, 1991, 27, 1195-1196; Kreuzer et al., "Erasable optical storage in bistable liquid-crystal cells," *Mol. Cryst. Liq. Cryst.*, 1992, 222, 219-227; Glushchenko et al., "Memory effect in filled nematic liquid crystals," *Liq. Cryst.*, 1997, 23, 241-246.) More recent work has focused on the incorporation of nanomaterials, as increasingly more useful nanomaterials of varying shapes, sizes, and compositions are now available. (Qi et al., "Impact of nanoscale particles and carbon nanotubes on current and future generations of liquid crystal displays," *J. Mater. Chem.*, 2008, 18, 3288-3294.) Carbon nanotubes (CNTs) are a particularly interesting nanomaterial because of their anisometric shape, which may make them compatible with a nematic host and may enable CNTs to form lyotropic-type nematic phases of their own. (Jeong et al., "Electroactive Superelongation of Carbon Nanotube Aggregates in Liquid Crystal Medium," *Nano Lett.*, 2007, 7, 2178-2182; Dierking et al., "Magnetically steered liquid crystal-nanotube switch," *Appl. Phys. Lett.*, 2005, 87, 233507; Dierking et al., "Liquid crystal-carbon nanotube dispersions," *J. Appl. Phys.*, 2005, 97, 044309; Dierking et al., "Aligning and Reorienting Carbon Nanotubes with Nematic Liquid Crystals," *Adv. Mater.*, 2004, 16, 865-869; Song et al., "Nematic Liquid Crystallinity of Multiwall Carbon Nanotubes," *Science,* 2003, 302, 1363.) Some studies of these materials have revealed that they may have the capacity to affect parameters such as threshold voltage, response time, dielectric anisotropy, and elastic constants of a given LC host. (Lee et al., "Effects of carbon-nanotube doping on the performance of a TN-LCD," *J. Soc. Inf. Disp.*, 2005, 13, 743-747; Chen et al., "Electro-Optical Characteristics of a Twisted Nematic Liquid-Crystal Cell Doped with Carbon Nanotubes in a DC Electric Field," *Opt. Rev.*, 2005, 12, 223-225; Huang et al., "Electrooptical Properties of Carbon-Nanotube-Doped Twisted Nematic Liquid Crystal Cell," *Jpn. J. Appl. Phys.*, 2006, 45, 6392-6394; Huang et al., "Electrooptical Responses of Carbon Nanotube-Doped Liquid Crystal Devices," *Jpn. J. Appl. Phys.*, 2005, 44, 8077-8081.) Though many of the exhibited effects could be positive for LCD technologies (such as decreased response time), decreased transmittance and increased threshold voltage due to elastic constant effects may inhibit their use. (Jeon et al., *Appl. Phys. Lett.*, "Effects of carbon nanotubes on electro-optical characteristics of liquid crystal cell driven by in-plane field," 2007, 90, 121901.) In some studies, it has been found that doping a nematic LC material with a positive Ac with either gold (Au) or silver (Ag) nanoparticles or CdTe QDs (CdTe QDs having a mixed monolayer) induced homeotropic alignment of the molecules in plain glass slides. (Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221.) This finding by Qi et al. may be useful for two reasons; for one, the nanoparticles induced bulk alignment of the LC phase without the use of alignment layers and secondly, the nanoparticles aligned the material homeotropically, opposite to what one would expect of this type of LC material on plain, untreated glass. Further analysis of the system of Qi et al. also revealed that the alignment abilities of the nanoparticles were strong enough to oppose the alignment abilities of typical rubbed polyimide alignment layers such that the mixtures exhibited homeotropic alignment when loaded into electro-optic cells with planar alignment. The study by Qi et al. also revealed that, despite the positive $\Delta\in$ of the LC material, the mixture still underwent a switching upon application of an electric field. Although not wishing to be bound by theory, this may mean that the presence of nanoparticles essentially caused the positive $\Delta\in$ material to behave as though it were a negative $\Delta\in$ material. Although not wishing to be bound by theory, to explain this behavior, a model was proposed by Qi et al., where the nanoparticles reside on the inner surfaces of the glass slides, behaving in a similar way to a surfactant type alignment layer inducing homeotropic alignment. Upon application of the electric field, the nanoparticles interfere with conduction of potential directly across the material in a linear fashion and instead, potential radiates outward from the nanoparticles. This may induce a splayed type alignment of the LCs and may permit light to pass through the analyzer. It was also found that the nanoparticle dopants induced changes in the electro-optic behavior of the LC host; specifically, they decreased the average threshold voltage and increased the average dielectric anisotropy. (Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221; Qi et al., "Effects of functionalized metal and semiconductor nanoparticles in nematic liquid crystal phases," *Proc. SPIE-Int. Soc. Opt. Eng.*, 2008, 6911, 691106.) Though many of these effects could be positive for displays, defects in the alignment could be an inhibiting factor. (Qi et al., "Impact of nanoscale particles and carbon nanotubes on current and future generations of liquid crystal displays," *J. Mater. Chem.*, 2008, 18, 3288-3294; Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221.)

In one or more embodiments, the role of the capping agent, the quantum dot size and core material on the induced LC effect may be studied.

The following examples are provided to illustrate the one or more embodiments of the present disclosure. It will be understood, however, that the specific details given in each example have been selected for the purpose of illustration and are not to be construed as limiting in scope of the one or more embodiments of the present disclosure.

EXAMPLES

In the examples, mixtures of LC1 (FIG. 1) with size-separated apolar hexadecylamine-capped CdSe (favoring homeotropic anchoring of the nematic LC) and polar thioglycolic acid-capped CdTe quantum dots (favoring planar anchoring of the nematic LC), among other things, were prepared and analyzed, which may yield information on the effect that the size and the different capping agent of the semiconductor QDs may have on the effects they induce.

Testing Methods Used

POM images were taken using an Olympus BX51-P polarizing microscope with either a Linkam LS350 or an Instec HC HCS302 heating/cooling stage. Electro-optic analysis was performed using an LCAS 1 automated liquid crystal analyzer from LC Vision and the Instec HC HCS302 heating/cooling stage. The electro-optic data were measured using the single cell method built into the LCAS 1 software as initially described by Wu et al. (Wu et al., "Physical-properties of chlorinated liquid-crystals," *Liq. Cryst.*, 1991, 10, 635-646.) The LC test cells used with the Linkam stage were planar 5.0 micron cells with parallel or antiparallel polyimide alignment layers purchased from Linkam. The LC test cells used with the Instec stage were planar 5.0 micron cells with antiparallel polyimide alignment layers and 1° to 3° pre-tilt (Instec, Inc.). For all POM imaging and electro-optic tests, prior to filling the LC test cells by capillary forces with the LC in the isotropic liquid phase with no electric field applied, the LC mixtures were heated above the isotropic/nematic phase transition temperature and cooled at a rate of 1° C. min$^{-1}$ until the desired temperature below the isotropic/nematic phase change ("T below Iso") was reached. The T below Iso, rather than the exact temperature, was used so that the measurements and images were taken at the same region in the nematic phase. The average and standard deviation of each electro-optic parameter was calculated from at least five to ten measurements at the given temperature carried out between two cells.

Electro-optic analysis is used to quantify how a liquid crystal sample interacts with an applied electric field. A liquid crystal molecule will reorient so that the dipole moment of the molecule (quantified as dielectric anisotropy) is aligned with the applied field, above a certain threshold voltage ($V_{th}$) (measured as a 5% change in capacitance). Elastic constants define the energy required for specific motions of the molecules. The $K_{11}$ or splay elastic constant defines the energy for reorientation from planar to homeotropic alignments.

Producing CdSe Nanoparticles

The CdSe quantum dots were purchased from Sigma-Aldrich. The CdSe quantum dots were in separate solutions in toluene with fluorescence emission maxima of 480 nm (herein, "CdSe 480"), 520 nm (herein, "CdSe 520"), 560 nm (herein, "CdSe 560"), 590 nm (herein, "CdSe 590"), and 610 nm (herein, "CdSe 610") (FIG. 2a), which varied in size from about 2.5 to about 5.2 nm (respectively, 2.5 nm, 3.0 nm, 3.5 nm, 4.0-4.3 nm, and 4.7-5.2 nm—certificates of analysis). The as-purchased CdSe 480, CdSe 520, CdSe 560, CdSe 590, and CdSe 610 quantum dots used were surface stabilized with hexadecylamine (i.e., CdSe quantum dots having pure monolayer of hexadecylamine). These quantum dots were used as purchased.

Producing CdTe Nanoparticles

The CdTe quantum dots were synthesized and size-separated as previously reported by Gaponik et al. (Gaponik et al., "Thiol-Capping of CdTe Nanocrystals: An Alternative to Organometallic Synthetic Routes," *Phys. Chem. B*, 2002, 106, 7177-7185. See also Zhang et al., "The Influence of Carboxyl Groups on the Photoluminescence of Mercaptocarboxylic Acid-Stabilized CdTe Nanoparticles," *J. Phys. Chem. B*, 2003, 107, 8-13.)

Figure 2C:
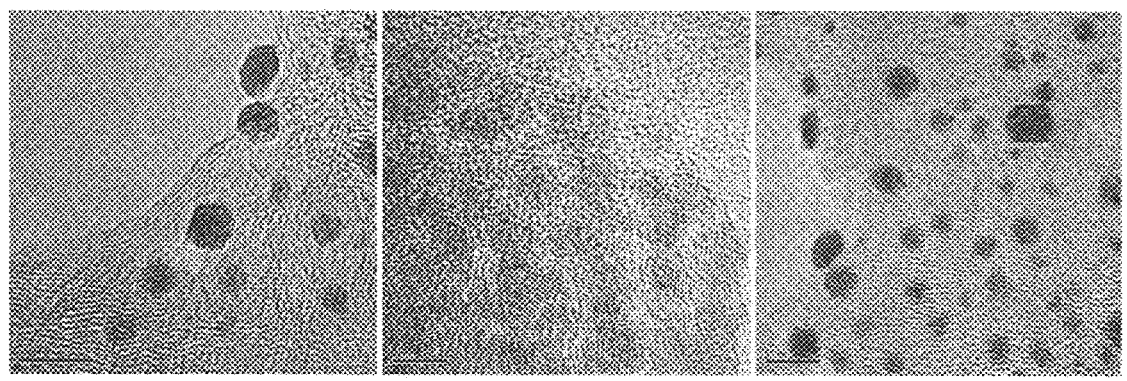
FIG. 2c shows three polarized optical microscopy (POM) images of CdTe quantum dots before size separation (the scale bar in each image=5 nanometers).

FIG. 2c shows three high-resolution TEM images of the CdTe QDs before size separation. The high-resolution transmission electron microscopy (TEM) images were obtained on a Jeol ultrahigh resolution FEG-T/STEM operating at an acceleration voltage of 200 kV. A 10 μL drop of the QD solution prior to size separation was drop-cast on a carbon-coated copper grid (400-mesh) and dried for at least 1 hour. FIG. 2c shows the high-resolution TEM images of the thioglycolic acid-capped CdTe QDs before size separation. The TEM images show that the sizes range from about 2.5 to 5.0 nm. For most of the QD homogeneous crystalline domains with cubic zinc blende crystal structure, which is commonly observed for CdTe QDs capped with thioglycolic acid in this size regime (see, e.g., Pradhan et al., "Three-dimensional structure of CdX (X=Se,Te) nanocrystals by total x-ray diffraction," J. Appl. Phys., 2007, 102, 044304). Thereafter, the photoluminescence and UV-vis absorption spectra were used to determine the size and size distribution using photoluminescence and excitonic absorption peak maxima and FWHM of the emission peaks, which provides more precise bulk information on QD size and size distribution in comparison to TEM image analysis tools.

The CdTe QDs were all capped with a thioglycolic acid (TGA) capping agent (ranging in size from 3.2 nm, 3.4 nm, 3.7 nm to 4.0 nm with fluorescence emission maxima of 530 nm, 560 nm, 590 nm, and 610 nm, respectively) and dispersed in water. Because of degradation issues, the CdTe QDs were never removed from solution after precipitation and thus were used by determining the concentration of the stock solutions (by measuring the difference in weight between the QD-containing solutions and pure water of equal volume) and dissolving the amount of QDs desired for the mixture in an excess of methanol (as much as needed to dissolve the QDs) in order to allow dissolution of the QDs in toluene. Fluorescence spectra were collected using a Varian Cary Eclipse with an excitation wavelength $\lambda_{exc.}$ of 400 nm for all QDs, except for CdSe 590 and CdSe 610 for which $\lambda_{exc.}$ was 500 nm.

Materials Used

The mixtures of the CdSe quantum dots in the phenylpyrimidine LC1 (used as purchased from Synthon Chemicals GmbH (Wolfen, Germany)) and CdTe quantum dots in the phenylpyrimidine LC1 (used as purchased from Synthon Chemicals GmbH (Wolfen, Germany)) were separately made by weighing suitable amounts of the solid liquid crystal using a micro-balance and dissolving it in a known amount of toluene. The toluene solutions of the CdSe QDs or methanol/water solutions of the CdTe QDs were then combined in a V-vial with the LC to produce the desired concentration of QDs in LC1 (wt-% mixtures). The solvent was then allowed to evaporate under a steady stream of nitrogen at about 40 to 70° C. for about 24 to 48 hours.

Several sizes of monodisperse CdSe and CdTe QDs were analyzed at varying weight percent in the LC host to determine the effect of size on the alignment and electro-optic properties induced.

Example 1

2 wt-% mixtures of each of the hexadecylamine capped CdSe 480, CdSe 520, CdSe 560, CdSe 590, and CdSe 610 mixtures were prepared in LC1 and analyzed (see FIGS. 3a-3j, 3c' and 3c"). At this weight percent in plain glass slides, it was found that most QDs (CdSe 480, CdSe 520, CdSe 560, and CdSe 610) induced homeotropic alignment of the LC host with varying amounts of birefringent stripe defects and little to no visible aggregation (similar to that exhibited by the alkanethiol capped Au, Ag nanoparticles and CdTe QDs, shown previously (Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221.)).

The CdSe 590 mixture was the exception to this (FIG. 3d), revealing an indication that size of the QD may have some effect. POM images of this mixture revealed that the CdSe 590 QDs did not significantly affect the LC alignment, but exhibited a large degree of aggregation. Unlike between plain glass slides, POM images of all mixtures in the aligned cells showed homogenous planar alignment with very little aggregation (FIG. 3f-j), similar to the non-doped LC. This suggests that the directing abilities of the QDs were not great enough to surpass that of the alignment layers of the cell.

Figures 4A, 4B:
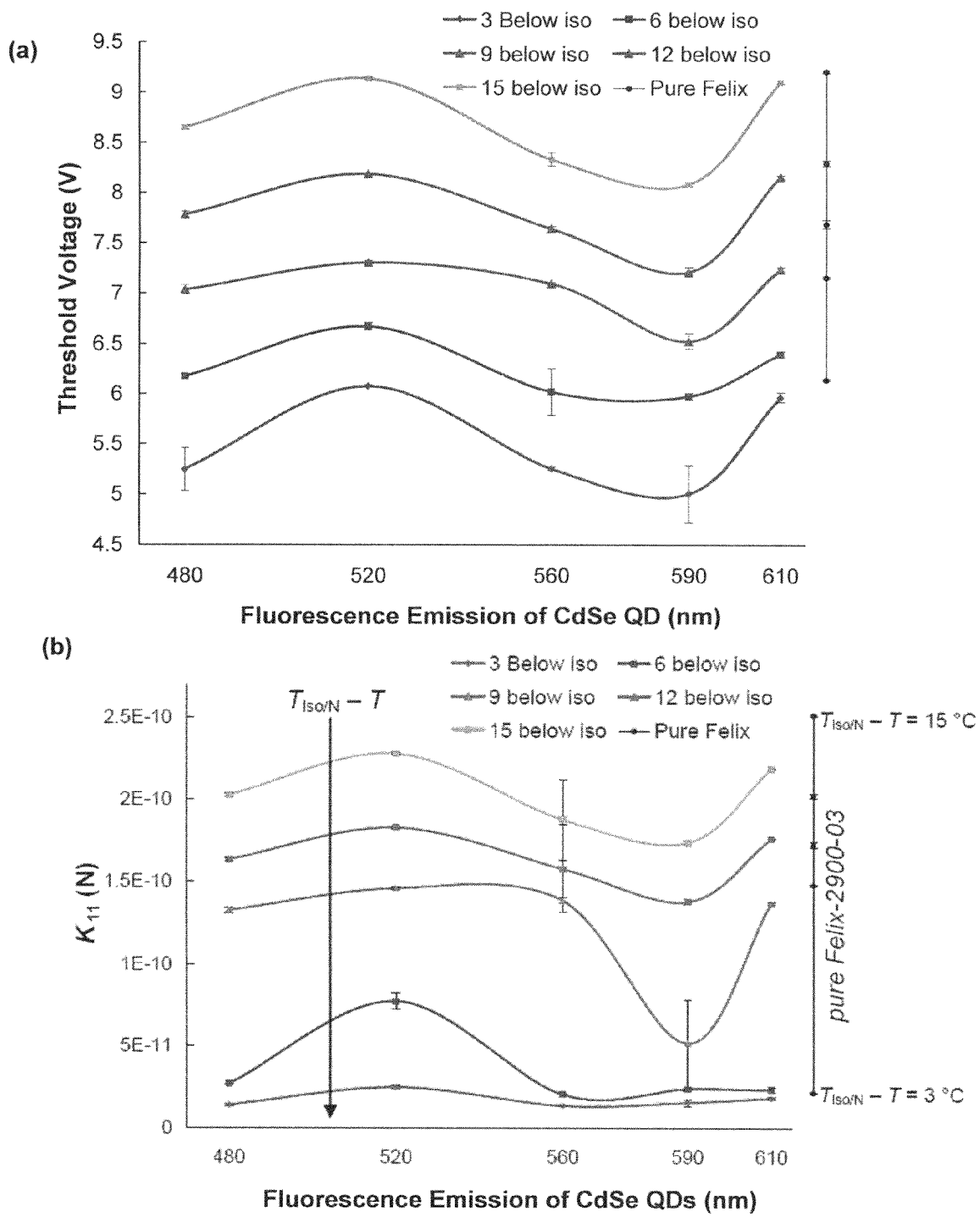
FIGS. 4a and 4b show plots of each of (a) threshold voltage and (b) $K_{11}$ elastic constant for the 2 wt-% mixtures versus QD size (shown as fluorescence emission wavelength) of the CdSe QDs for various temperatures below the isometric/nematic phase transition temperature (e.g., "3 Below iso" means that $T_{Iso/N}-T=3°$ C.). The values for pure LC1 at the same reduced temperatures are shown on the right of each plot for comparison, wherein the highest value corresponds with $T_{Iso/N}-T=15°$ C. and the lowest value corresponds with $T_{Iso/N}-T=3°$ C. Note that FIGS. 6a, 6b, 8a, 8b, 9a, 9b, 11a, 11b, and 15 have similar naming conventions and corresponding LC1 comparison plot. In order of increasing threshold voltage and $K_{11}$, the lines represent mixtures that are 3, 6, 9, 12, and 15 degrees Celsius below Iso (i.e., below the isometric/nematic phase transition temperature). Herein, unless otherwise noted, threshold voltages are given in volts (V) and $K_{11}$ elastic constants are given in Newtons (N).
Figures 5A, 5B, 5C, 5D, 5E, 5F, 5G, 5H, 5I, 5J:
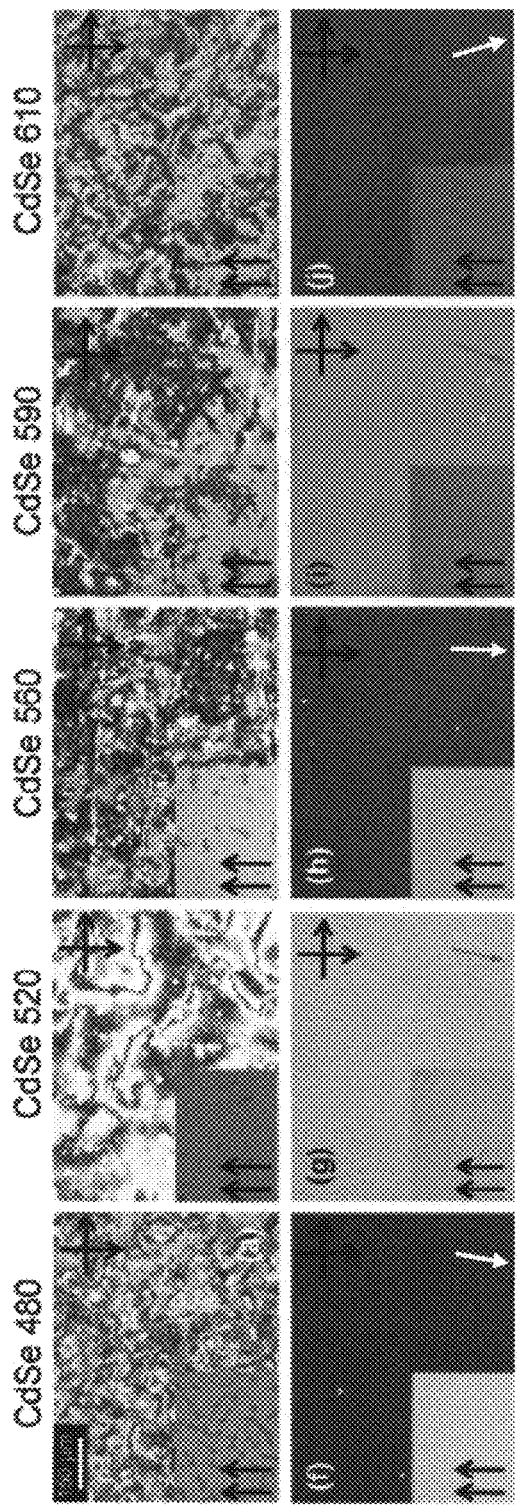
FIGS. 5a-5e show POM images of 5 wt-% mixtures of CdSe 480, CdSe 520, CdSe 560, CdSe 590, CdSe 610 QDs in the nematic phase of LC1 between plain glass slides at $T_{Iso/N}-T=9°$ C.
FIGS. 5f-5j show POM images of 5 wt-% mixtures of CdSe 480-610 QDs in the nematic phase of LC1 in planar aligned cells. The insets in FIGS. 5f-5j show the same image with parallel (un-crossed) polarizers. The arrows in the lower right corner of FIGS. 5f-5j show the rubbing direction of the planar cells.

Electro-optic analysis of these mixtures revealed further size dependence as some QDs had essentially no effect on the electro-optic properties of the host, whereas others had a reasonably large effect. The largest effects for the data set arose for the CdSe 480 QDs and CdSe 590 QDs. Although not wishing to be bound by theory, the CdSe 480 QDs may have induced an enhanced effect because of their presence at a larger mole percent, though the CdSe 590 effect was not caused by aggregation and may be intrinsic to the QD (FIGS. 4a and 4b).

Example 2

Mixtures of 5 wt-% CdSe dopant in LC1 were prepared and analyzed. POM images in plain glass slides revealed that the QDs induced different effects at 5 wt-% than at 2 wt-%. For all mixtures, extensive aggregation of the QDs was seen, and the alignment of the LC host was not significantly altered (see FIGS. 5a-5j), similar to what was seen for the 2 wt-% CdSe 590 mixture (FIG. 3d). In the aligned glass cells, POM images again revealed that all mixtures produced homogenous alignment of the host with little aggregation. Although not wishing to be bound by theory, the lack of aggregates in the cell may result from a filtering effect that occurs upon loading of the mixture into the cell. Since the aggregates were typically in the 10-100 μm size range and the cell gap was about 5 μm, it may be presumed that these aggregates were not permitted to enter the cell.

Figures 6A, 6B:
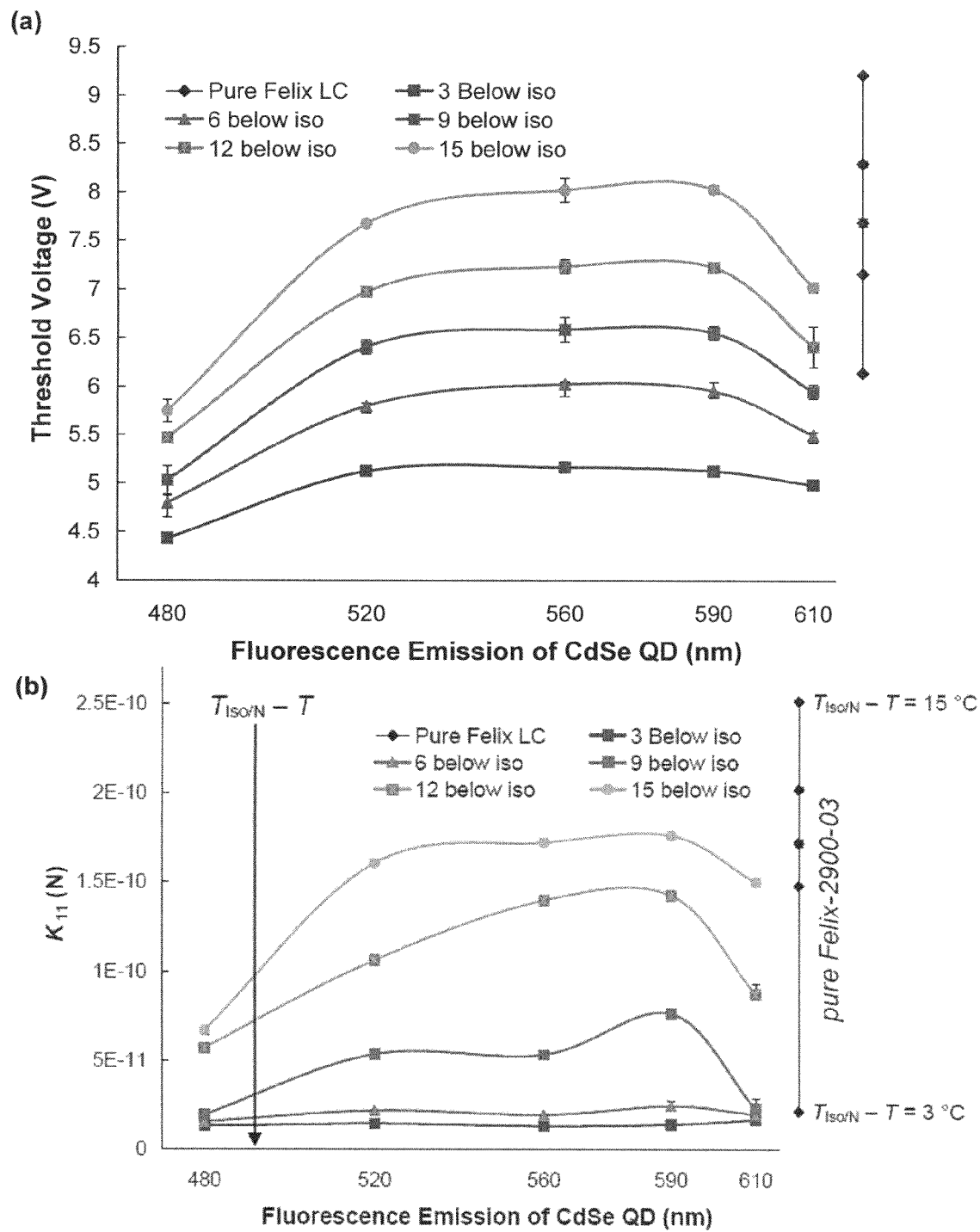
FIGS. 6a and 6b show plots of each of (a) threshold voltage and (b) $K_{11}$ elastic constant for the 5 wt-% mixtures versus QD size (shown as fluorescence emission wavelength of the CdSe QDs).
Figure 6C:
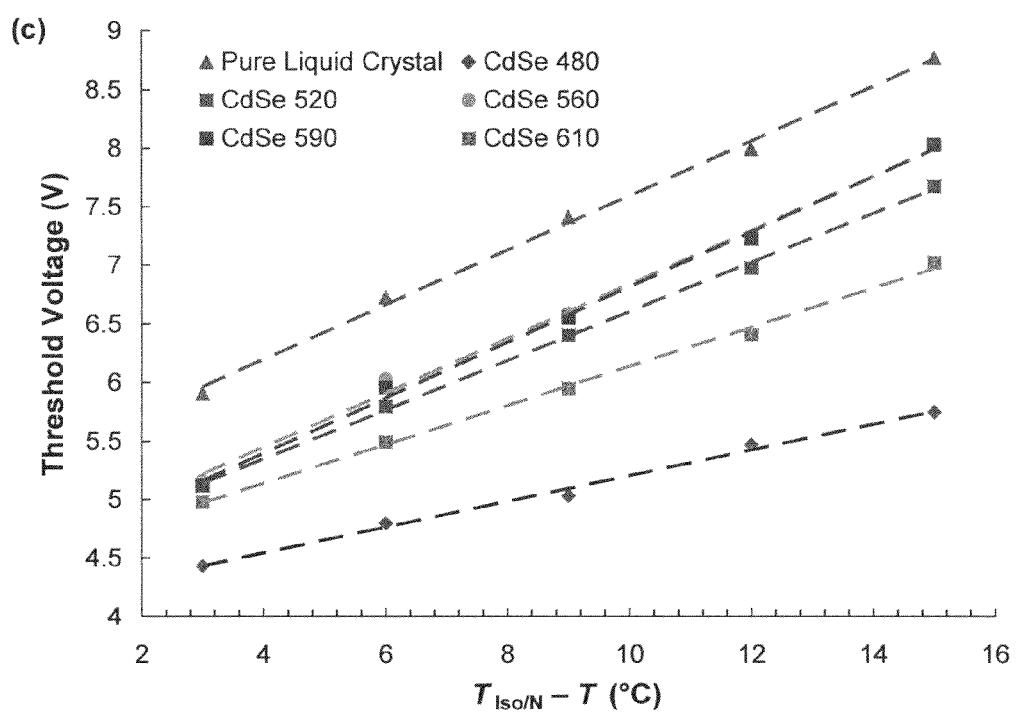
FIG. 6c shows a plot of threshold voltage versus the reduced temperature $(T_{Iso/N}-T)$ for CdSe 480, CdSe 520, CdSe 560, CdSe 590, CdSe 610, and pure liquid crystal (LC1), demonstrating the linear response across the nematic range. In order of increasing threshold voltage, the lines represent CdSe 480, CdSe 610, CdSe 520, CdSe 590, CdSe 560, and pure liquid crystal.

Electro-optic analysis of these mixtures revealed that all QDs (CdSe 480, CdSe 520, CdSe 560, CdSe 590, and CdSe 610) showed at least some effect on the electro-optic properties of the LC host, with some QDs exhibiting larger effects than others (namely, the CdSe 480 and CdSe 610 QDs). It was also shown that the electro-optic parameters varied predictably (e.g., higher threshold voltage and higher $K_{11}$ values at lower temperatures) across the nematic phase temperature range for all mixtures (FIGS. 6a and 6b). Again, not wishing to be bound by theory, the CdSe 480 enhanced effect may be the result of larger mole percent (due to smaller particle size), but the CdSe 610 enhanced effect may be intrinsic since a relatively fewer number of QDs (based on the larger QD size at the same wt-%) exhibited this enhanced effect.

Figures 7A, 7B, 7C:
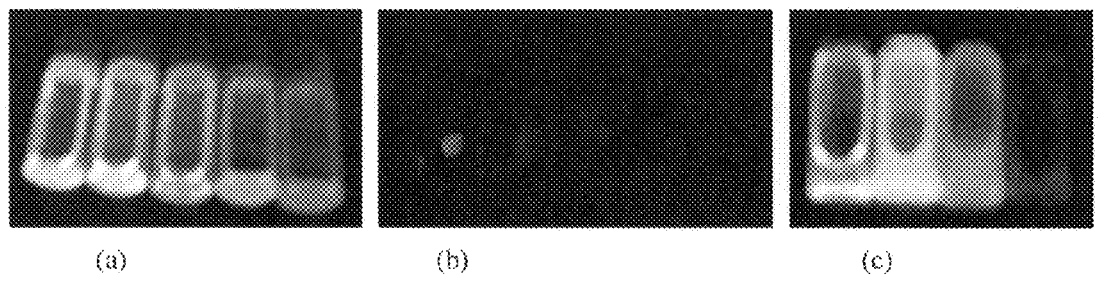
FIGS. 7a and 7b show images of fluorescing CdSe QDs: (a) in toluene (left-most image) and (b) in LC1 at $T_{Iso/N}-T=9°$ C., demonstrating a shift in emission peak maximum and quenching of the flourescence (excited by UV light at $\lambda_{exc.}=366$ nm) (middle image).
FIG. 7c shows an image of fluorescing CdTe QDs in water (excited by UV light at $\lambda_{exc.}=366$ nm) (right-most image).
Figures 8A, 8B:
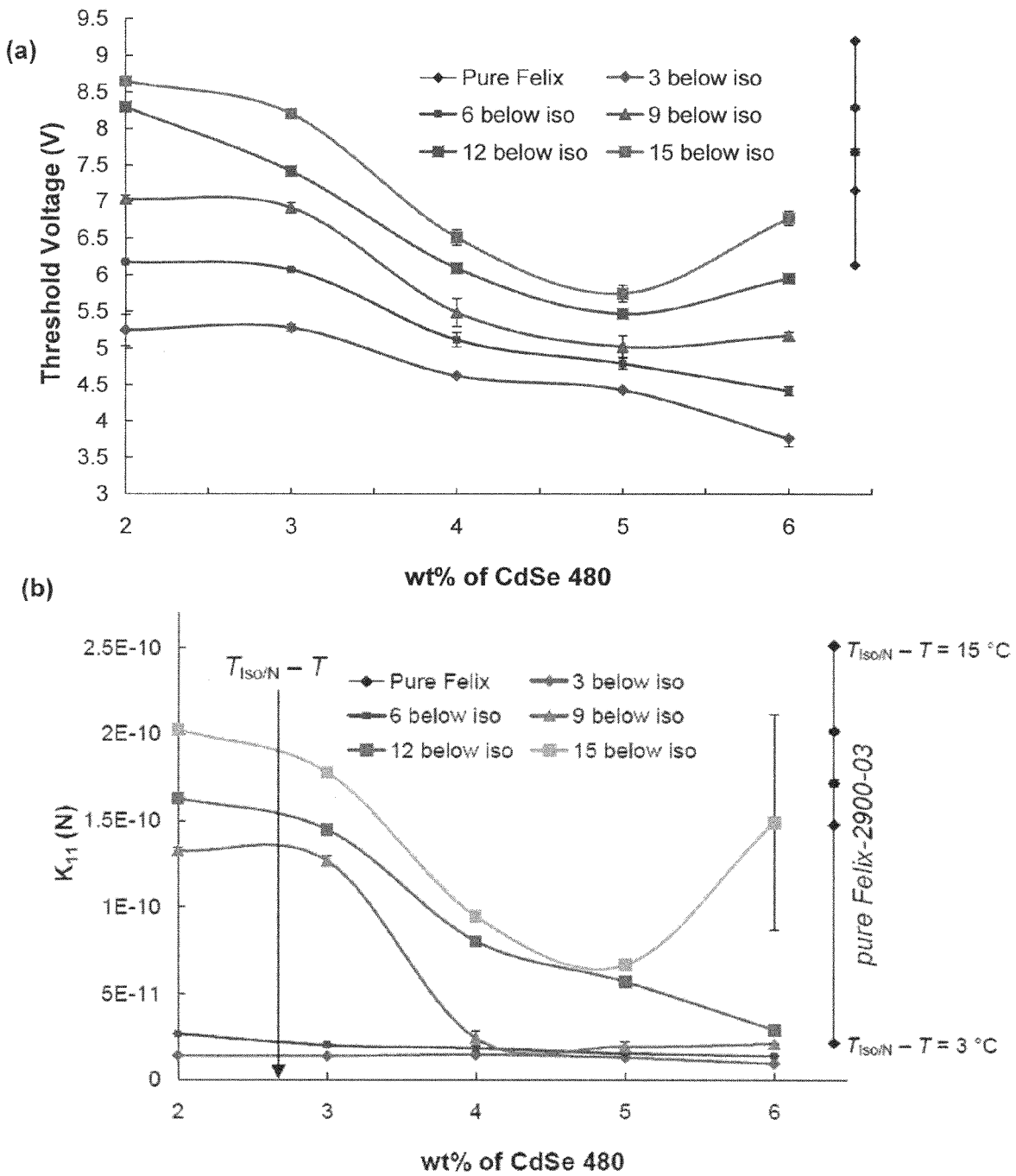
FIGS. 8a and 8b show plots of (a) threshold voltage and (b) $K_{11}$ elastic constant versus wt-% CdSe 480. In order of increasing threshold voltage and $K_{11}$ at 2 wt-%, the lines represent 3, 6, 9, 12, and 15 degrees Celsius below Iso. The values for pure LC1 at the same reduced temperatures are shown on the right of each plot for comparison.
Figures 9A, 9B:
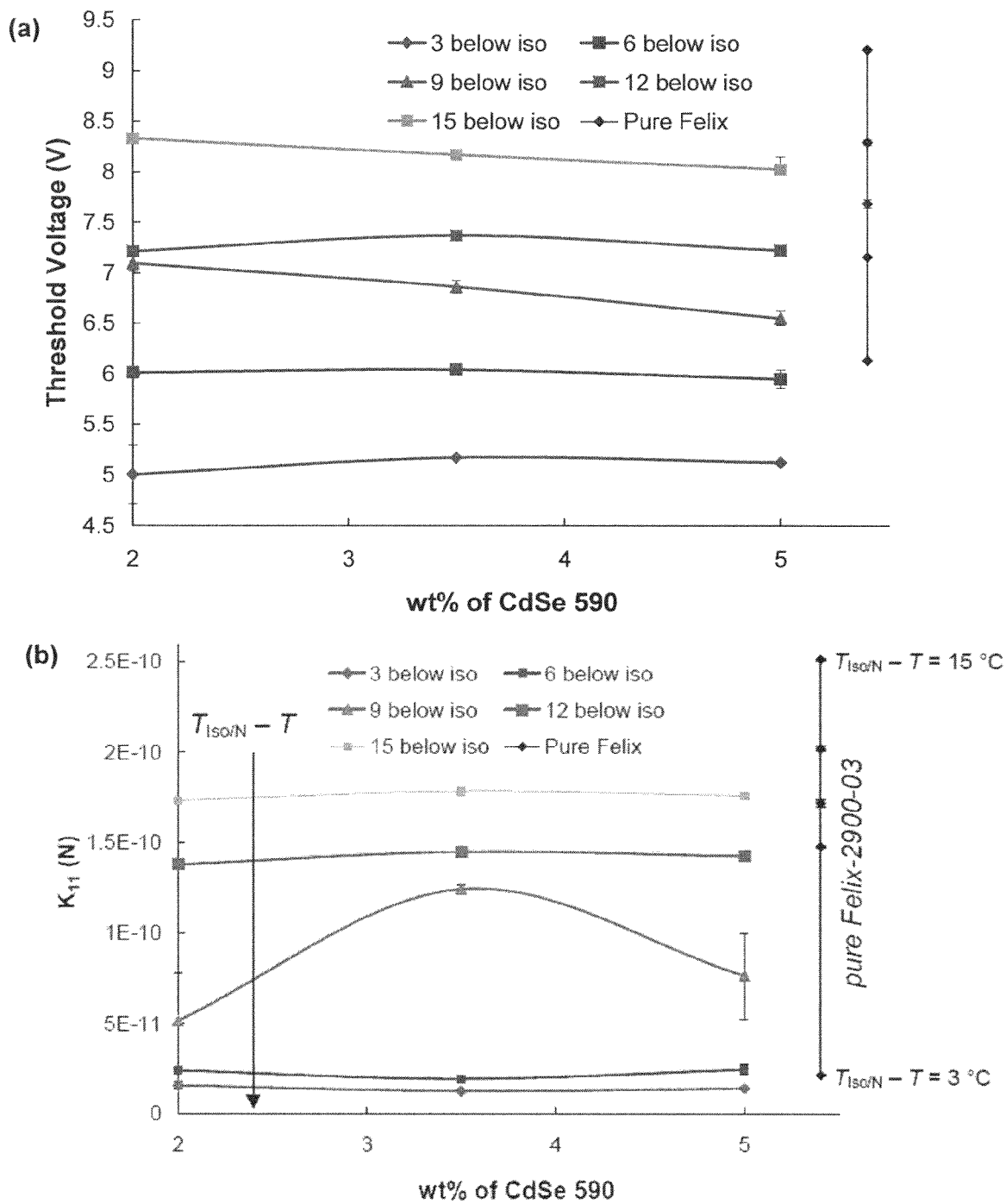
FIGS. 9a and 9b show plots of (a) threshold voltage and (b) $K_{11}$ elastic constant versus wt-% CdSe 590. In order of increasing threshold voltage and $K_{11}$ at 2 wt-%, the lines represent 3, 6, 9, 12, and 15 degrees Celsius below Iso. The values for pure LC1 at the same reduced temperatures are shown on the right of each plot for comparison.
Figures 10A, 10B, 10C, 10D, 10E, 10F, 10G, 10H:
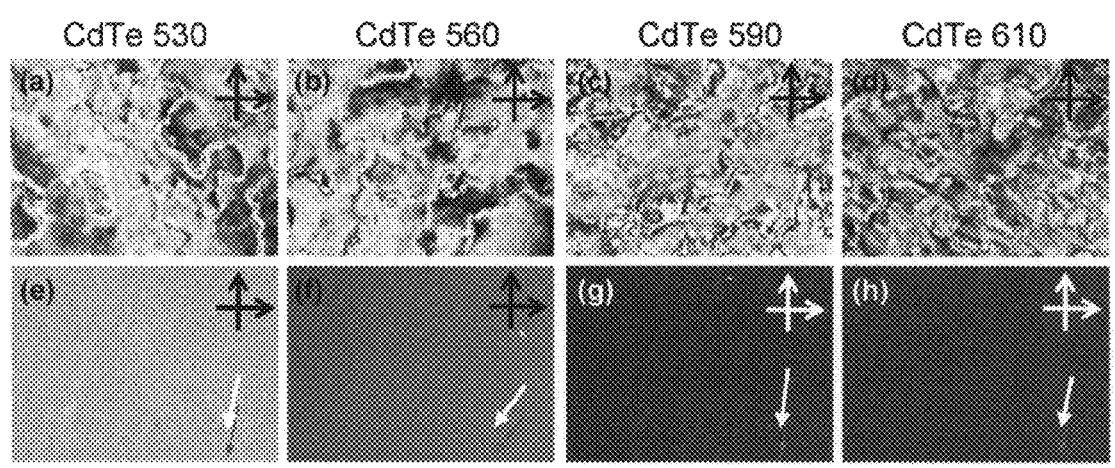
FIGS. 10a-10d show POM images of 2 wt-% CdTe mixtures in the phenylpyrimidine LC in plain glass slides.
FIGS. 10e-10h show POM images of 2 wt-% CdTe mixtures in the phenylpyrimidine LC in aligned cells. The arrows in the lower right corner of FIGS. 10e-10h show rubbing direction of the planar cells.

Also at this weight percent, it was possible to see the QDs fluorescing in the LC host. The images in FIGS. 7a-7c reveal that the fluorescence emission color slightly changes when the QDs are essentially transferred from toluene as a solvent to the LC host. This shift and a slight quenching of the fluorescence is a well-known phenomenon that occurs when fluorescent QDs exchange solvent and results from changes in the amount of non-radiative energy emitted from the QDs. (Walker et al., "Quantum-dot optical temperature probes,"*Appl. Phys. Lett.*, 2003, 83, 3555-3557.)

The electro-optic properties of each of two QDs (CdSe 480 and CdSe 590) were analyzed in more detail, as these two showed the lowest values of the threshold voltage at 2 and 5 wt-% (CdSe 480 at 5 wt-% and CdSe 590 at 2 wt-%). The data are summarized in FIGS. 8a, 8b, 9a, and 9b.

Example 3

2 wt-% mixtures of the size-separated thioglycolic acid-capped CdTe QDs were prepared and analyzed in the phenylpyrimidine LC1 host. POM images in plain glass slides revealed that none of the QDs had significant effects on the LC alignment and the QDs did not appear to aggregate extensively (FIG. 10a-10d). In aligned glass slides, the mixtures again appeared very similar to the non-doped LC, producing homogenous planar alignment with little to no aggregates (FIG. 10e-10h).

Figures 11A, 11B:
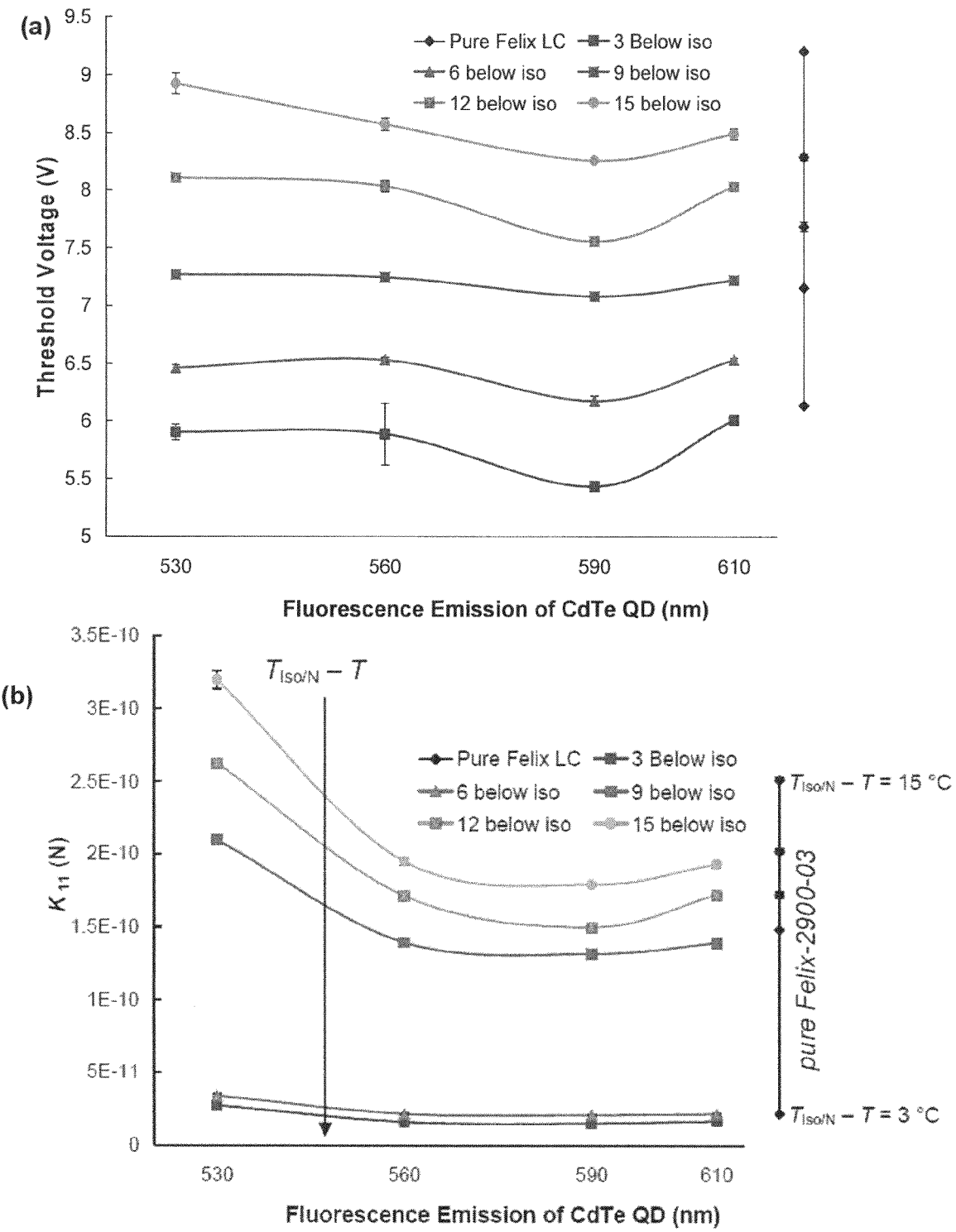
FIGS. 11a and 11b show plots of a) threshold voltage and b) $K_{11}$ elastic constant for the 2 wt-% mixtures versus fluorescence emission wavelength of the dopant CdTe QDs, demonstrating the effect of size of CdTe QDs on electro-optic parameters. In order of increasing threshold voltage and $K_{11}$ at 2 wt-%, the lines represent 3, 6, 9, 12, and 15 degrees Celsius below Iso. The values for pure LC1 at the same reduced temperatures are shown on the right of each plot for comparison.

Electro-optic analysis revealed that the CdTe QDs had a small, but noticeable effect on the LC host dependent on the QD used (FIGS. 11a and 11b). The smallest QDs (e.g., CdTe 530) exhibited an effect similar to that seen for some gold (Au) QDs (Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221), where they decreased the threshold voltage but increased the $K_{11}$ elastic constant. This is somewhat counterintuitive, since threshold voltage and $K_{11}$ should be proportional following equation 1 (eq. 1) above.

Although not wishing to be bound by theory, this may have arisen because of the QDs' (e.g., CdTe 530) effect on the dielectric anisotropy of the material; pure LC1 has a $\Delta\in$ of about 0.5 to 0.6 (depending on T), but with the QDs this increased to about 0.8 to 0.9. The extent of this change in $\Delta\in$ was not seen for any other CdTe or CdSe QDs and affected the $K_{11}$ value. The larger QDs behaved more similar to all other CdSe mixtures and CdTe mixtures, causing a slight decrease in both $K_{11}$ and $V_{th}$.

Figure 11C:
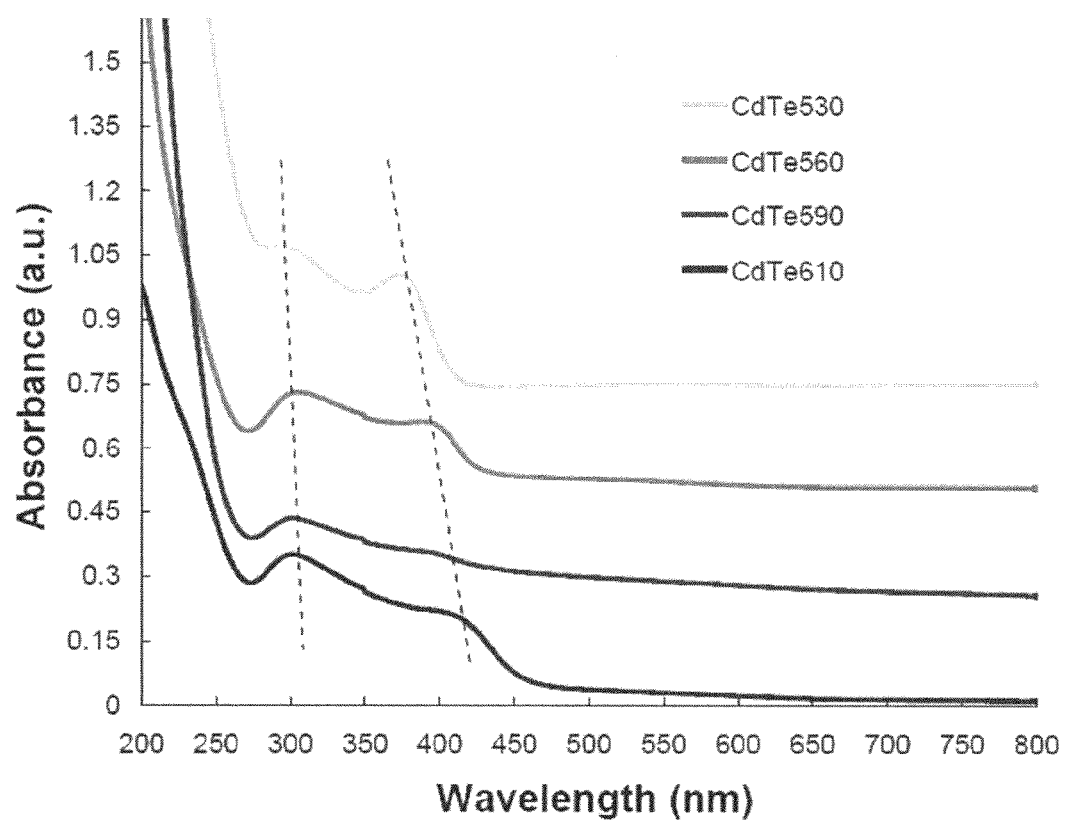
FIG. 11c shows the UV-vis spectra of thioglycolic acid-capped CdTe QDs in water in plots of absorbance (in arbitrary units) versus wavelength (in nanometers). In order of increasing absorbance a wavelength of 800 nm, the lines represent CdTe 610, CdTe 590, CdTe 560, and CdTe 530.
Figures 12A, 12B, 12C, 12D, 12E, 12F, 12G, 12H, 12I, 12J, 12K:
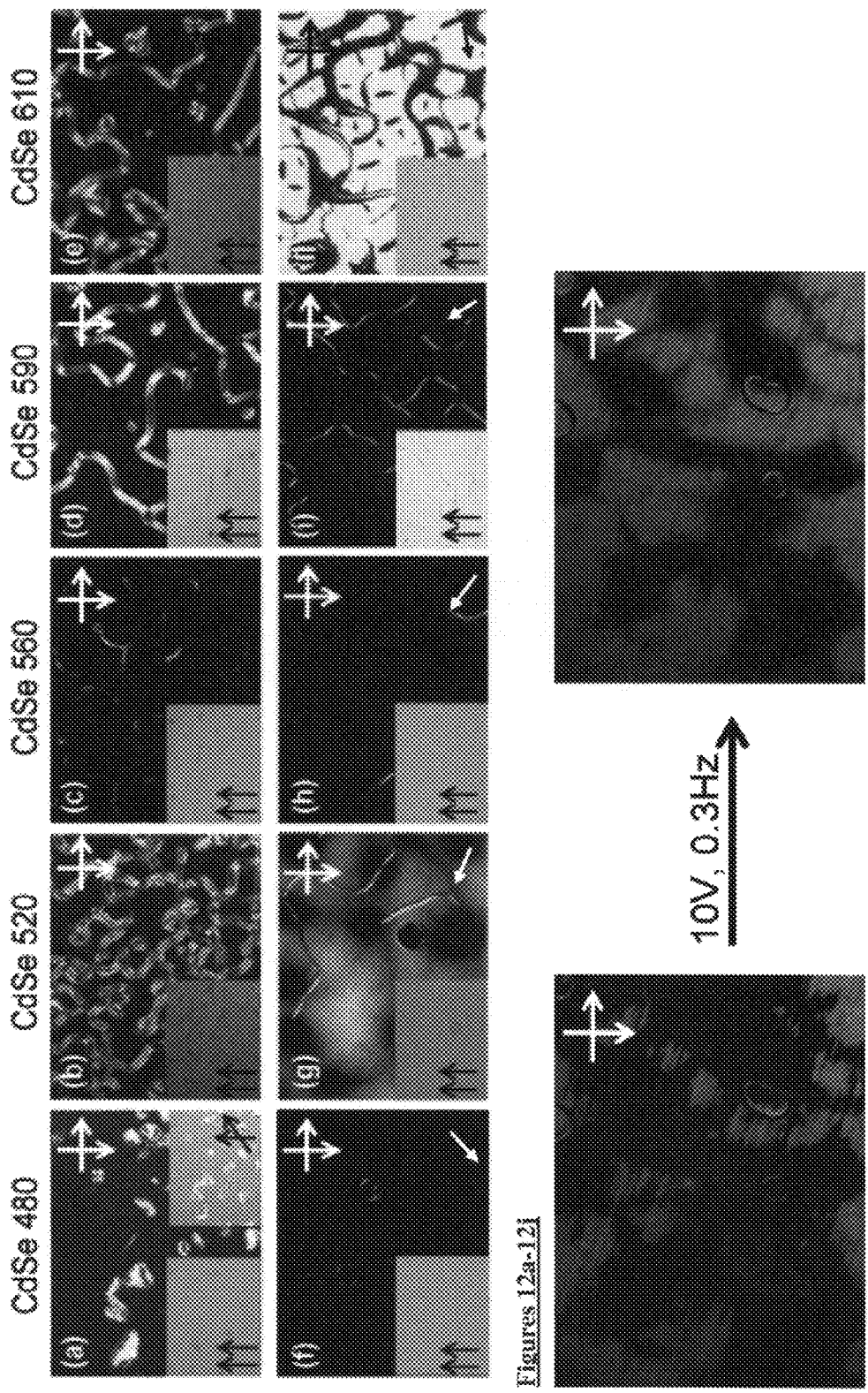
FIGS. 12a-12e show POM images of 1 wt-% mixtures of CdSe 480, CdSe 520, CdSe 560, CdSe 590, CdSe 610 QDs in the nematic phase of LC1 between plain glass slides at $T_{Iso/N}-T=9°$ C. The left insets in FIGS. 12a-12e show the same image with parallel (un-crossed) polarizers and the right inset in FIG. 12a shows the same image with slightly uncrossed polarizers (about 30°.
FIGS. 12f-12j show POM images of 5 wt-% mixtures of CdSe 480, CdSe 520, CdSe 560, CdSe 590, CdSe 610 QDs in the nematic phase of LC1 in planar aligned cells at $T_{Iso/N}$-T=9° C. The insets in FIGS. 12f-12j show the same image with parallel (un-crossed) polarizers. The arrows in the lower right corner of FIGS. 12f-12j show the rubbing direction of the planar cells.
FIG. 12k shows optical photomicrographs of the 1 wt % CdSe480 in LC1 mixture with (right) and without (left) an applied field. The arrows in the lower right corner of the images show the rubbing direction of the cell.

The UV-vis spectra of the thioglycolic acid-capped CdTe quantum dots in water are shown in FIG. 11c. A Varian Cary 5000 UV-vis-NIR photospectrometer was used to obtain the UV-vis spectra. The two dashed lines indicate the shift in the two absorption bands to larger wavelengths, indicating increases in QD size from the CdTe 530 particles to the CdTe 610 particles.

Example 4

1 wt-% mixtures of each of the hexadecylamine capped CdSe 480, CdSe 520, CdSe 560, CdSe 590, and CdSe 610 mixtures were prepared in LC1 and analyzed (see FIGS. 12a-12j). At 1 wt-%, the particles induced homeotropic alignment of the liquid crystal with birefringent stripe defects in plain glass slides. Size effects were seen in aligned cells, where both CdSe 480 and CdSe 590 exhibited homogeneous vertical alignment, whereas CdSe 520, CdSe 590, and CdSe 610 showed variable alignment. In FIG. 12k, optical photo-shows the K11 elastic constant values for the CdTe 590 QDs at 2 wt-%, 3 wt-%, 4 wt-%, and 5 wt-%.

Example 7

Figures 16A, 16B, 16C, 16D, 16E, 16F:
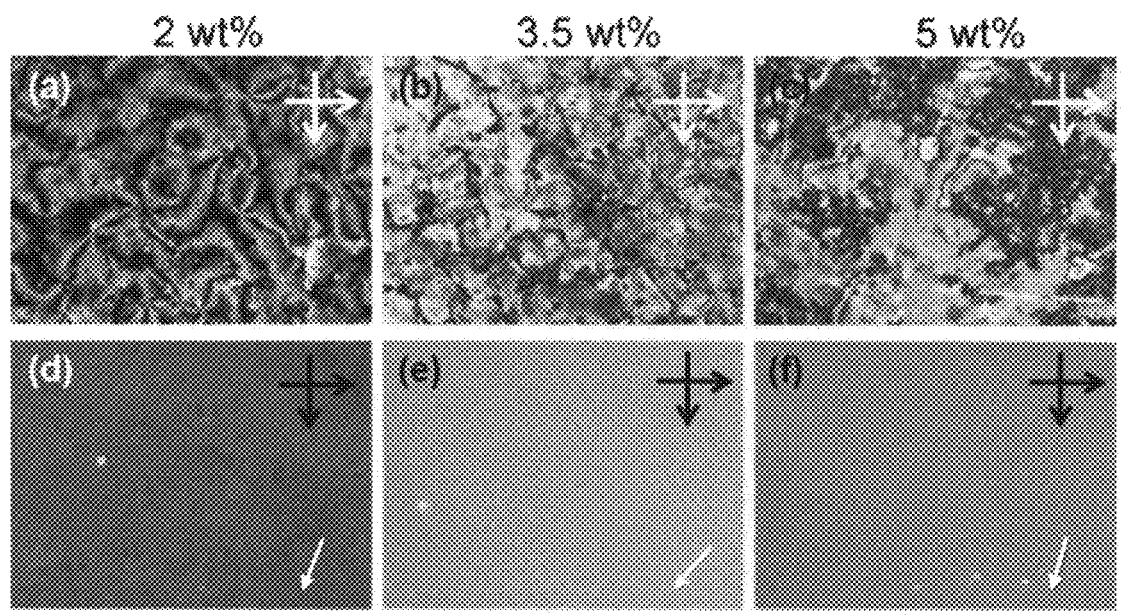
FIGS. 16a-16f show POM images of the different concentrations of the CdSe590 QDs in the nematic phase of LC1 at $T_{Iso/N}$-T=9° C. between plain glass slides (a) at 2 wt %, (b) at 3.5 wt %, and (c) at 5 wt % and in planar aligned cells (d) at 2 wt %, (e) at 3.5 wt %, and (f) at 5 wt %. Arrows in the lower right corner of FIGS. 16d-16f show rubbing direction of the planar cells.

A mixture having a weight percentages of 3.5 wt-% of the hexadecylamine capped CdSe 590 QDs were prepared in LC1 and analyzed. FIGS. 16a-16f show POM images at 2 wt-% (prepared in Example 1), 3.5 wt-% and 5 wt-% (prepared in Example 2) in the nematic phase of LC1 at $T_{Iso/N}$-T=9° C. between plain glass slides (FIGS. 16a-16c) and in planar aligned cells (FIGS. 16d-16f).

The resistivity, R, of CdSe- and CdTe-doped LC1 mixtures are provided in Table 2. All resistivity values are on the order of gigaohms (G) or $10^9 \Omega$) or larger. Resistivity was measured using an LCAS I automated test-bed (LC Vision, Inc.).

TABLE 2

Resistivity of QD-doped LC1 mixtures

Resistivity, R in $\Omega$ (SD = standard deviation)

| | 3° C. below Iso | | 6° C. below Iso | | 9° C. below Iso | | 12° C. below Iso | | 15° C. below Iso | |
|---|---|---|---|---|---|---|---|---|---|---|
| Sample Description | Value | SD | Value | SD | Value | SD | Value | SD | Value | SD |
| pure Felix-2900-03 | 10.41E+10 | 3.19E+09 | 16.9E+10 | 3.07E+09 | 21.5E+10 | 2.61E+10 | 23.2E+10 | 5.94E+09 | 27.6E+10 | 1.38E+10 |
| 2.0% CdSe$_{480}$ | 3.187E+10 | 5.21E+08 | 3.89E+10 | 2.44E+08 | 4.58E+10 | 2.48E+08 | 5.30E+10 | 3.49E+08 | 6.08E+10 | 1.99E+08 |
| 2.0% CdSe$_{520}$ | 2.924E+10 | 2.01E+08 | 3.44E+10 | 3.84E+08 | 4.10E+10 | 7.09E+08 | 4.75E+10 | 2.18E+08 | 5.44E+10 | 1.28E+09 |
| 2.0% CdSe$_{560}$ | 2.227E+10 | 4.85E+08 | 2.76E+10 | 2.76E+08 | 3.19E+10 | 3.71E+08 | 5.38E+10 | 4.05E+08 | 6.25E+10 | 2.88E+08 |
| 2.0% CdSe$_{590}$ | 2.983E+10 | 1.71E+08 | 3.51E+10 | 4.74E+08 | 4.07E+10 | 3.28E+08 | 4.71E+10 | 4.64E+08 | 5.30E+10 | 8.16E+08 |
| 2.0% CdSe$_{610}$ | 2.785E+10 | 2.47E+08 | 3.29E+10 | 1.82E+08 | 3.75E+10 | 2.99E+08 | 4.13E+10 | 3.64E+08 | 4.73E+10 | 2.13E+08 |
| 5.0% CdSe$_{480}$ | 2.748E+10 | 3.73E+08 | 3.26E+10 | 5.17E+08 | 3.87E+10 | 4.85E+08 | 4.46E+10 | 6.50E+08 | 5.03E+10 | 7.08E+08 |
| 5.0% CdSe$_{520}$ | 2.678E+10 | 1.09E+08 | 3.27E+10 | 2.36E+08 | 3.88E+10 | 2.89E+08 | 4.63E+10 | 8.36E+08 | 5.53E+10 | 1.09E+09 |
| 5.0% CdSe$_{560}$ | 2.878E+10 | 5.58E+08 | 3.53E+10 | 4.28E+08 | 4.35E+10 | 1.37E+09 | 4.96E+10 | 4.28E+08 | 5.78E+10 | 2.27E+08 |
| 5.0% CdSe$_{590}$ | 2.22E+10 | 9.68E+08 | 3.15E+10 | 5.40E+08 | 3.76E+10 | 2.87E+08 | 4.35E+10 | 9.54E+08 | 5.14E+10 | 3.61E+08 |
| 5.0% CdSe$_{610}$ | 2.613E+10 | 4.43E+08 | 3.39E+10 | 3.71E+08 | 4.44E+10 | 3.77E+08 | 5.62E+10 | 6.72E+08 | 7.05E+10 | 2.75E+08 |
| 2.0% CdTe$_{530}$ | 1.35E+10 | 2.14E+08 | 1.48E+10 | 2.13E+08 | 1.60E+10 | 5.50E+08 | 1.71E+10 | 1.25E+08 | 1.93E+10 | 3.41E+08 |
| 2.0% CdTe$_{560}$ | 0.51E+10 | 5.63E+07 | 0.63E+10 | 0.00E+00 | 0.75E+10 | 6.31E+07 | 0.87E+10 | 1.59E+08 | 1.01E+10 | 4.85E+07 |
| 2.0% CdTe$_{590}$ | 1.79E+10 | 6.00E+07 | 2.20E+10 | 1.35E+08 | 2.65E+10 | 4.79E+07 | 3.04E+10 | 2.23E+08 | 3.51E+10 | 1.25E+08 |
| 2.0% CdTe$_{610}$ | 0.63E+10 | 4.19E+07 | 0.78E+10 | 1.07E+06 | 0.93E+10 | 1.83E+08 | 1.09E+10 | 1.59E+07 | 1.25E+10 | 4.29E+07 |
| 3.0% CdSe$_{480}$ | 2.71E+10 | 6.92E+08 | 3.21E+10 | 1.81E+08 | 3.70E+10 | 2.12E+08 | 4.28E+10 | 2.06E+08 | 4.83E+10 | 2.31E+08 |
| 4.0% CdSe$_{480}$ | 2.198E+10 | 1.56E+08 | 2.69E+10 | 2.46E+08 | 3.16E+10 | 1.65E+08 | 3.56E+10 | 1.13E+08 | 4.03E+10 | 2.11E+08 |
| 6.0% CdSe$_{480}$ | 2.50E+10 | 3.21E+08 | 3.03E+10 | 5.30E+08 | 3.60E+10 | 2.78E+08 | 4.06E+10 | 6.16E+08 | 4.62E+10 | 7.02E+08 |
| 3.5% CdSe$_{590}$ | 2.34E+10 | 6.84E+07 | 2.74E+10 | 2.48E+08 | 3.13E+10 | 1.11E+08 | 3.29E+10 | 4.62E+07 | 3.67E+10 | 1.54E+08 |
| 3.0% CdTe$_{590}$ | 0.26E+10 | 1.83E+07 | 0.31E+10 | 1.22E+07 | 0.36E+10 | 0.00E+00 | 0.43E+10 | 2.28E+07 | — | — |
| 4.0% CdTe$_{590}$ | 0.27E+10 | 1.30E+07 | 0.32E+10 | 5.24E+07 | 0.36E+10 | 1.44E+07 | 0.43E+10 | 5.33E+07 | — | — |
| 5.0% CdTe$_{590}$ | 0.27E+10 | 3.23E+07 | 0.33E+10 | 1.19E+07 | 0.42E+10 | 1.93E+07 | 0.525E+10 | 3.65E+07 | — | — | micrographs of the 1 wt-% CdSe 480 in LC1 with (left image) and without (right image) an applied electric field.

Example 5

Figures 13A, 13B, 13C, 13D, 13E, 13F, 13G, 13H, 13I, 13J:
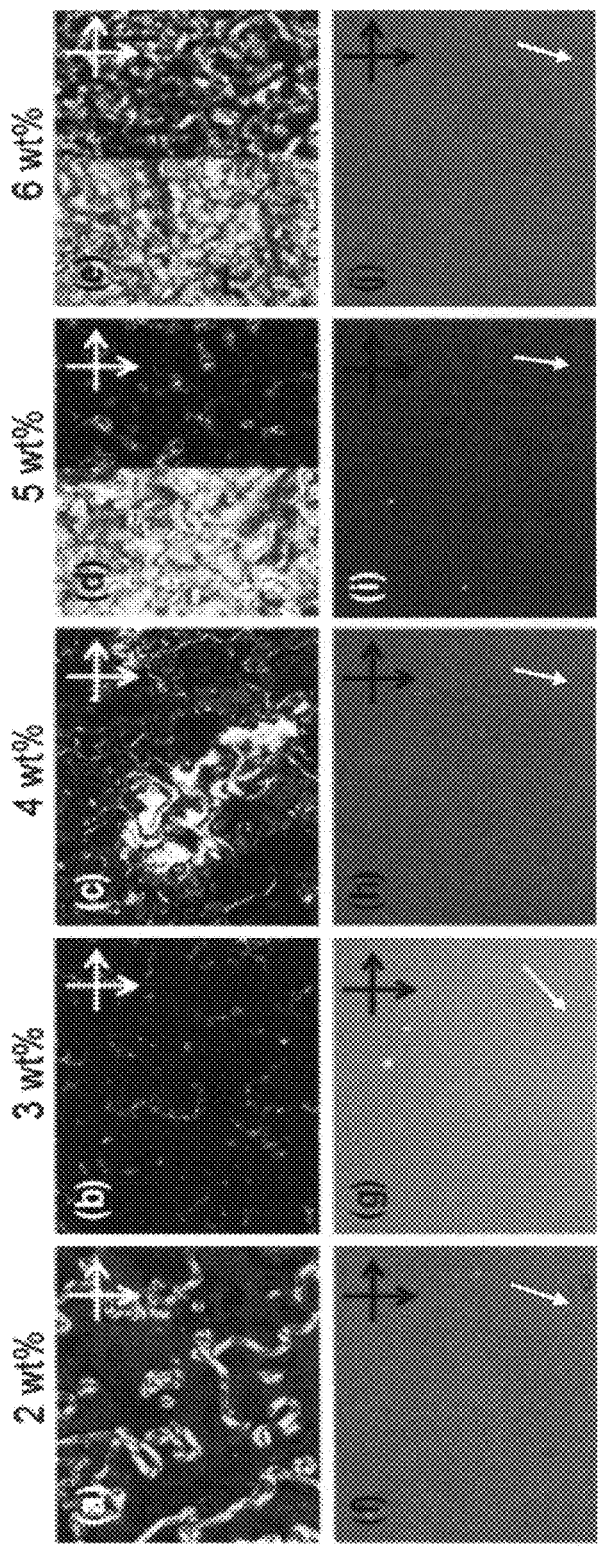
FIGS. 13a-13j show POM images of the different concentrations of the CdSe 480 QDs in the nematic phase of LC1 at $T_{Iso/N}$-T=9° C. between plain glass slides (a) at 2 wt %, (b) at 3 wt %, (c) at 4 wt %, (d) at 5 wt %, (e) at 6 wt % and in planar aligned cells (f) at 2 wt %, (g) at 3 wt %, (h) at 4 wt %, (i) at 5 wt %, (j) at 6 wt %. Arrows in the lower right corner of FIGS. 13f-13j show rubbing direction of the planar cells.
Figures 14A, 14B, 14C, 14D, 14E, 14F, 14G, 14H:
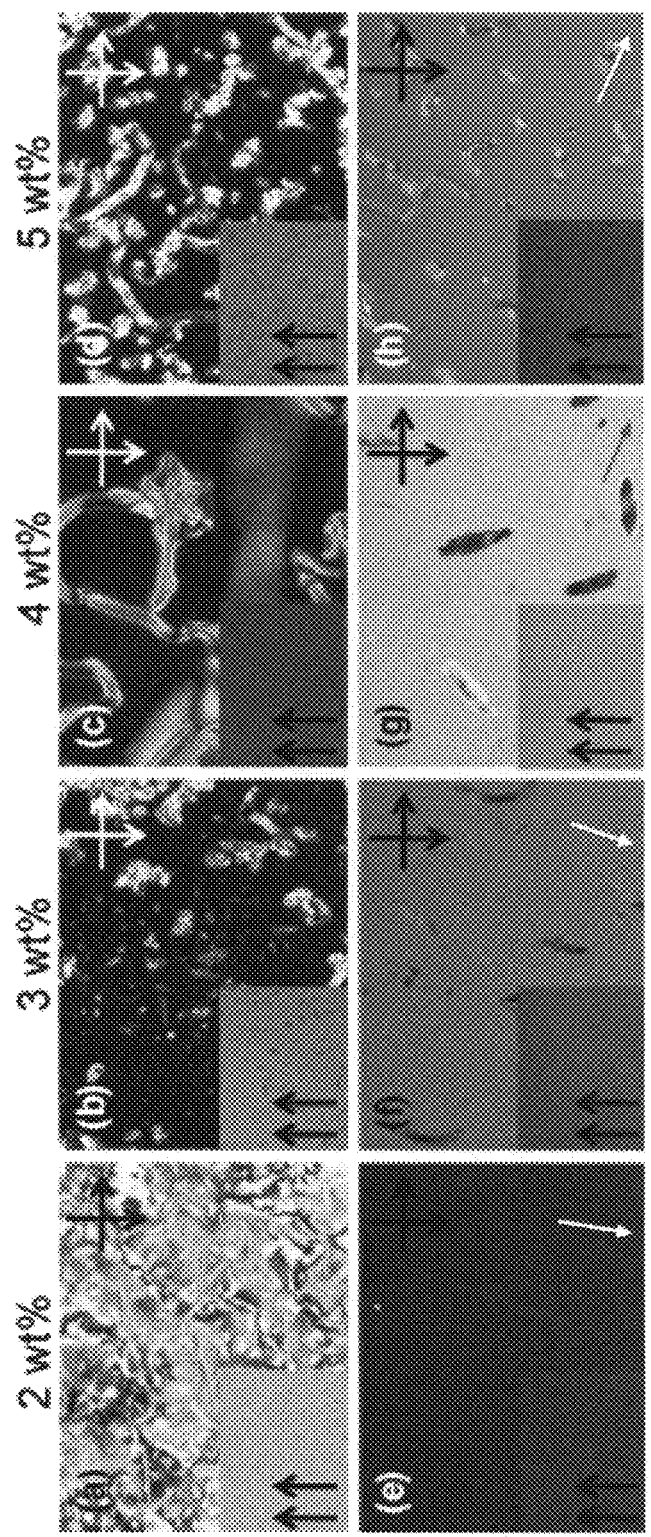
FIGS. 14a-14h show POM images of the different concentrations of the CdTe590 QDs in the nematic phase of LC1 at $T_{Iso/N}$-T=9° C. between plain glass slides (a) at 2 wt %, (b) at 3 wt %, (c) at 4 wt %, (d) at 5 wt % and in planar aligned cells (e) at 2 wt %, (f) at 3 wt %, (g) at 4 wt %, (h) at 5 wt %. Arrows in the lower right corner of FIGS. 14e-14h show rubbing direction of the planar cells. The insert in each figure shows the same area with parallel (un-crossed) polarizers.

Mixtures having weight percentages of 2 wt-%, 3 wt-%, 4 wt-%, 5 wt-%, and 6 wt-% of the hexadecylamine capped CdSe 480 QDs were prepared in LC1 and analyzed (see FIGS. 13a-13j). At 5 and 6 wt-% between plain, untreated glass slides, areas (domains) with planar alignment and evidence of CdSe480 QD aggregation as well as homeotropically aligned domains coexist. Images of both domains are shown in FIGS. 13d and 13e.

Example 6

Figure 15:
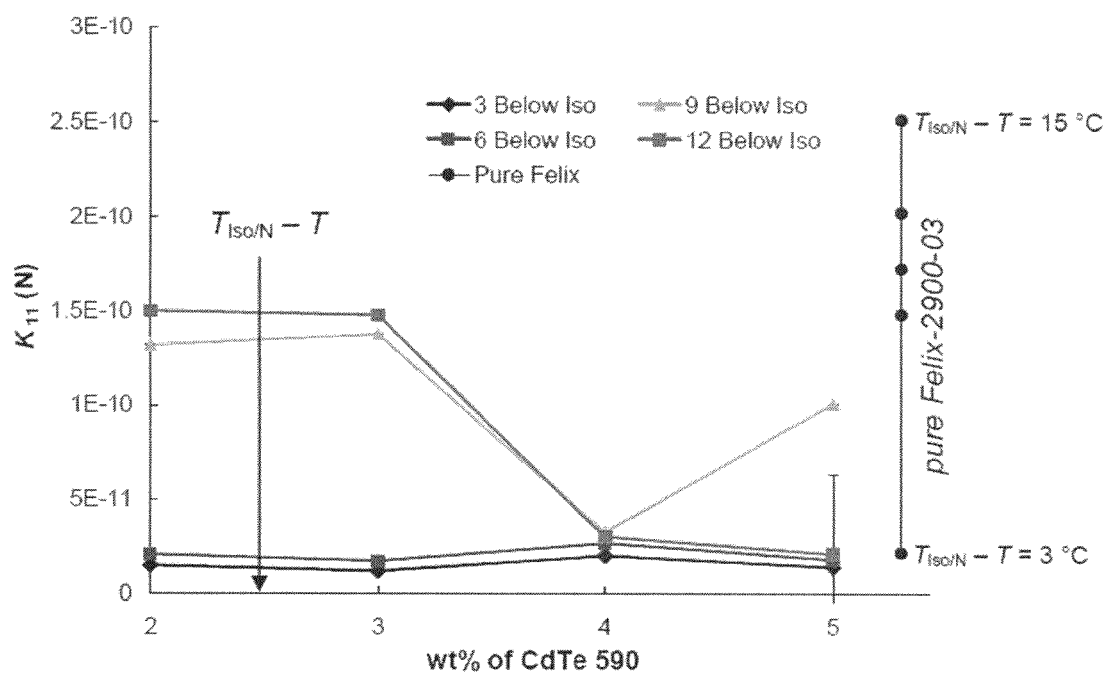
FIG. 15 shows plots of $K_{11}$ elastic constant versus wt-% CdSe 480. In order of increasing $K_{11}$ at 2 wt-%, the lines represent 3, 6, 9, and 12 degrees Celsius below Iso. The values for pure LC1 at those same reduced temperatures and 15 degrees Celcius below Iso are shown on the right of the plot for comparison.

Mixtures having weight percentages of 2 wt-%, 3 wt-%, 4 wt-%, and 5 wt-% of the size-separated thioglycolic acid-capped CdTe 590 QDs were prepared and analyzed in the phenylpyrimidine LC1 host (see FIGS. 14a-14h). FIG. 15

It appears from the results of the CdSe and CdTe examples that there may be some relationship between the QD size and the alignment and electro-optic effects it elicits in the host. This relationship, though, is not a simple one; but rather may be affected by a variety of factors including, but not limited to, miscibility and intrinsic properties of the QDs. Some error in the $K_{11}$ measurements, while small, may arise from a potential pre-tilt effect induced by QDs residing at the alignment layer-LC interface. Since the $K_{11}$ value is meant to describe a deformation between completely planar to completely vertical, pre-tilting of the LC (when the LC molecule does not begin completely planar) may cause errors in the measurement. Pre-tilting may be commonly somewhat variable between cells (which are supposed to have essentially no pre-tilt) and may also be induced by dopants. From these results, although not wishing to be bound by theory, there are several observations that may be made about the effect of size on the ability of the QD to alter the properties of the LC host. For one, it may be that some QDs are significantly more compatible with the host than others. This was exhibited in the POM images of the 2 wt-% mixtures, where the CdSe 590 mixture exhibited intense aggregation; where as the other mixtures had essentially no aggregates. Although it is not clear why this QD was the only one to exhibit aggregation, it may be the result of several factors. Aggregation of the QDs may essentially depend on the size and charge of the QD. Charge is introduced to the QDs by the amine or thiol capping agents, such that for each capping agent, the QD will obtain one negative charge. In general, the greater the surface charge and the larger the size (smaller the surface area), the less the QDs should tend to aggregate. Charge may be added to the QDs as they are capped with the negatively charged amines, producing coulomb repulsion between the QDs. The smaller QDs should have larger surface area per weight, thus there should be a greater amount of capping agent (and charge) for the group of QDs producing larger coulomb repulsions. The larger QDs, though, will have less charge per weight but may also have less surface area, decreasing their ability to aggregate easily. (Yaroslavov et al., "What Is the Effective Charge of TGA-Stabilized CdTe Nanocolloids?" *J. Am. Chem. Soc.*, 2005, 127, 7322-7323; Li et al., "Shape and Aggregation Control of Nanoparticles: Not Shaken, Not Stirred," *J. Am. Chem. Soc.*, 2006, 128, 968-975.) Although not wishing to be bound by theory, the CdSe 590 QD may aggregate because it neither has enough coulomb repulsion or little enough surface area to prevent it from doing so, though this is only a hypothesis. At 5 wt-%, all mixtures exhibited aggregation of varying degrees. Although not wishing to be bound by theory, this increase in the tendency to aggregate may have resulted from a seeding effect, where the high concentration of QDs caused some of them to aggregate despite repulsion. The small aggregates could then have acted as seeds where larger aggregates could form. Although not wishing to be bound by theory, the large level of aggregation in the sample may have prevented the QDs from inducing homeotropic alignment of the LC host. Upon loading the mixtures into the electro-optic cells, these aggregates may have been filtered out by the small cell gap. Although not wishing to be bound by theory, this filtering effect may mean that the amount of QDs in the LC host in the cell was not the same as in the prepared mixtures and was thus not precisely known. It appears though, that the amount of QDs entering the cell (dissolved in LC1) was consistent, as evident by the reproducibility of the results between mixtures and by examining the CdSe 590 results. At 2 wt-% and 5 wt-%, the CdSe 590 electro-optic data were essentially identical within experimental error, emphasizing the importance of the QDs' solubility.

It seems then that all of the QDs may have had limited solubility in the LC host ranging from less than 2 wt-% for CdSe 590 to nearly 5 wt-% for the other QD sizes. At 5 wt-%, all QDs, except CdSe 590, produced larger electro-optic effects, perhaps proportional to the additional QDs in the host. Knowing that the electro-optic effect for each QD may depend on its concentration, mixtures were prepared at other concentrations (weight percents) to more accurately determine the solubility of the QD by determining when the electro-optic effect diminishes.

The results seen in these examples, though, may not be explained purely by solubility differences. For example, the CdSe 590 mixture exhibited the largest decrease in $K_{11}$ and threshold voltage of all 2 wt-% mixtures, despite that significantly less of these QDs were present in the LC than in any other mixture, as a consequence of mole percent and solubility. Although not wishing to be bound by theory, this may indicate that the CdSe 590 QDs may have some intrinsic ability to decrease the $K_{11}$ and the threshold voltage of the host. Before discussing why these QDs may be better at altering the electro-optic properties of their host than other QDs, it first may be discussed why any QD is capable of this effect. One reason for the QDs affect on electro-optics is that they may introduce additional disorder into the LC phase, thus effectively decreasing the viscosity of the material and introducing micro-domains. In the nematic phase, the planar aligned LC molecules may essentially point in about the same direction. When QDs are added, they may disrupt the ordering of the molecules by incorporating themselves between individuals and groups of molecules (producing micro-domains). This may produce an increase in disorder in the system, decreasing viscosity, and enabling domains of nematic molecules to reorient quicker under an applied electric field. This may mean that, rather than the entire bulk of molecules having to switch all at once to produce re-alignment, several micro-domains may switch independently, effectively decreasing the applied potential required for the realignment. Another way by which the QDs may affect the electro-optic parameters of the nematic host is by increasing the capacitance in the system. The semiconducting QDs should have the ability to build up charge much more readily than the LC molecules, which may enable them to decrease the threshold voltage required for the realignment. Some QDs may be better than others, then, for a variety of reasons. For one, they may be more soluble in the host, enabling more QDs to enter the cells to increase the amount of disruption of order they may produce. Also, one QD may be better at disrupting the order of the nematic host than others; for example, a large QD may produce more disorder upon incorporation than a small QD. Finally, some QDs may have a greater ability to build up charge (increase capacitance) than other QDs. Although not wishing to be bound by theory, the latter two reasons may be the main reason why the CdSe 590 QDs produced such a large effect at 2 wt-% in comparison to other QD sizes, whereas the first reason may be responsible for the effects observed for the different QD concentrations (2 wt-% vs. 5 wt-%).

CdSe QDs and CdTe QDs, each with varying capping agents (i.e. with pure monolayers on CdSe and CdTe differing) and size were all capable of affecting the alignment and electro-optic properties of a nematic phenylpyrimidine LC1 host. Flexibility of the capping agent, aggregation effects and size may play a role in the miscibility of the QD in the nematic host. The CdSe QDs may induce homeotropic alignment of the LC1 host; a phenomena which could possibly be described by the model proposed by Qi et al. (Qi et al., "Unprecedented Dual Alignment Mode and Freedericksz Transition in Planar Nematic Liquid Crystal Cells Doped with Gold Nanoclusters," *Adv. Funct. Mater.*, 2008, 18, 212-221.) The size of the QD may affect its ability to alter the alignment and electro-optic properties of the host, perhaps because of solubility differences and intrinsic properties of the QDs. Finally, the addition of CdSe QDs to this nematic LC1 may provide an improved (e.g., efficient and/or predictable) means of altering the electro-optic properties for increased efficiency (decreased threshold voltage) and switching speed (decreased $K_{11}$ elastic constant) of the host, making them useful in LC mixtures for, for example, LCD technology.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A planar nematic liquid crystal cell comprising:
   a colloidal suspension comprising:
      a nematic liquid crystal with positive dielectric anisotropy; and
      nanoclusters comprising a monolayer of organic ligands, wherein the nanoclusters comprise cadmium selenide nanoclusters, and the monolayer comprises a single type of ligand; and
   one or more optional alignment layers.

2. The planar nematic liquid crystal cell of claim 1, wherein one or more of the cadmium selenide nanoclusters are cadmium selenide quantum dots.

3. The planar nematic liquid crystal cell of claim 1 wherein the nanoclusters comprise $C_4$-$C_{18}$ alkyl groups.

4. The planar nematic liquid crystal cell of claim 1, wherein the nanoclusters comprise hexadecylamine ligands.

5. The planar nematic liquid crystal cell of claim 1, wherein the ligands are polar.

6. The planar nematic liquid crystal cell of claim 1, wherein the ligands comprise an amine group.

7. The planar nematic liquid crystal cell of claim 1, wherein the nanoclusters further comprise cadmium telluride nanoclusters.

8. The planar nematic liquid crystal cell of claim 7, wherein the organic ligands comprise polar organic ligands.

9. The planar nematic liquid crystal cell of claim 7, wherein the organic ligands comprise thioglycolic acid ligands.

10. The planar nematic liquid crystal cell of claim 1, wherein the nematic liquid crystal is a non-chiral nematic liquid crystal.

11. The planar nematic liquid crystal cell of claim 1, wherein the colloidal suspension comprises no greater than 10 wt-% of nanoclusters, based on the total weight of the liquid crystal and nanoclusters and wherein the nanoclusters have an average size of no greater than 10 nm.

12. The planar nematic liquid crystal cell of claim 1, wherein the planar nematic liquid crystal cell has a cell gap of less than 7.0 microns.

13. The planar nematic liquid crystal cell of claim 1, wherein the nanoclusters have an average size of no greater than 7 nm.

14. The planar nematic liquid crystal cell of claim 1, wherein the average size of the nanoclusters is at least 1 nm.

15. The planar nematic liquid crystal cell of claim 1, wherein the nematic liquid crystal is uniaxial, biaxial, or discotic.

16. The planar nematic liquid crystal cell of claim 15, wherein the liquid crystal is

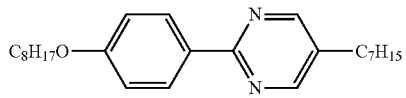

or a cyanobiphenyl derivative.

17. The planar nematic liquid crystal cell of claim 1, wherein the nanoclusters are present in the suspension in an amount of at least 0.1 wt-%, based on the total weight of the liquid crystal and nanoclusters.

18. The planar nematic, liquid crystal cell of claim 17, wherein the nanoclusters are present in the suspension in an amount of at least 2 wt-%, based on the total weight of the liquid crystal and nanoclusters.

19. A method of inducing a Freedericksz transition, the method comprising:
   providing a planar nematic liquid crystal cell comprising:
      a colloidal suspension comprising:
         a nematic liquid crystal with positive dielectric anisotropy; and
         nanoclusters comprising a monolayer of organic ligands, wherein the nanoclusters comprise cadmium selenide nanoclusters, and the monolayer comprises a single type of ligand; and
      one or more optional alignment layers; and
   applying an electric field across the cell to reorient the liquid crystal molecules, wherein the electric field is above the threshold field.

20. The method of claim 19, wherein one or more of the cadmium selenide nanoclusters are cadmium selenide quantum dots.

21. The method of claim 19, wherein the nematic liquid crystal is a non-chiral nematic liquid crystal.

22. The method of claim 19, wherein the colloidal suspension comprises no greater than 10 wt-% of nanoclusters, based on the total weight of the liquid crystal and nanoclusters and wherein the nanoclusters have an average size of no greater than 10 nm.

23. The method of claim 19, wherein the planar nematic liquid crystal cell has a cell gap of less than 7.0 microns.

24. The method of claim 19, wherein the nanoclusters have an average size of no greater than 7 nm.

25. The method of claim 19, wherein the average size of the nanoclusters is at least 1 nm.

26. The method of claim 19, wherein the nematic liquid crystal is uniaxial, biaxial, or discotic.

27. The method of claim 26, wherein the liquid crystal is

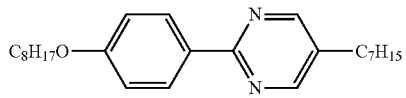

or a cyanobiphenyl derivative.

28. The method of claim 19, wherein the nanoclusters are present in the suspension in an amount of at least 0.1 wt-%, based on the total weight of the liquid crystal and nanoclusters.

29. The method of claim 28, wherein the nanoclusters are present in the suspension in an amount of at least 2 wt-%, based on the total weight of the liquid crystal and nanoclusters.

30. The method of claim 19, wherein the electric field is of varying frequency or varying wave form.

31. A method of controlling the alignment of a liquid crystal, the method comprising:
   filling a liquid crystal cell comprising one or more optional alignment layers with a mixture that comprises an isotropic liquid crystal and nanoclusters, wherein the nanoclusters comprise a monolayer of organic ligands, and wherein the nanoclusters comprise cadmium selenide nanoclusters, and the monolayer comprises a single type of ligand; and
   cooling the mixture below the liquid crystal isotropic-nematic phase transition temperature.

* * * * *